United States Patent [19]

Brenza

[11] Patent Number: 4,797,814
[45] Date of Patent: Jan. 10, 1989

[54] VARIABLE ADDRESS MODE CACHE

[75] Inventor: James G. Brenza, Putnam Valley, N.Y.

[73] Assignee: International Business Machines Corporation, Armonk, N.Y.

[21] Appl. No.: 858,322

[22] Filed: May 1, 1986

[51] Int. Cl.4 .............................................. G06F 12/08
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,070,706 | 1/1978 | Scheuneman | 364/200 |
| 4,290,103 | 9/1981 | Hattori | 364/200 |
| 4,322,795 | 3/1982 | Lange et al. | 364/200 |
| 4,464,712 | 8/1984 | Fletcher | 364/200 |
| 4,484,267 | 11/1984 | Fletcher | 364/200 |
| 4,495,575 | 1/1985 | Eguchi | 364/200 |
| 4,654,790 | 3/1987 | Woffinden | 364/200 |

OTHER PUBLICATIONS

"Cross Interrogate Directory for a Real, Virtual or Combined Real/Virtual Cache", J. G. Brenza, IBM T.D.B., vol. 26, No. 11, Apr. '84, p. 6069.

Primary Examiner—David Y. Eng
Assistant Examiner—Florin Munteanu
Attorney, Agent, or Firm—Bernard M. Goldman

[57] ABSTRACT

A data processing system which contains a multi-level storage hierarchy, in which the two highest hierarchy levels (e.g. L1 and L2) are private (not shared) to a single CPU, in order to be in close proximity to each other and to the CPU. Each cache has a data line length convenient to the respective cache. A common directory and an L1 control array (L1CA) are provided for the CPU to access both the L1 and L2 caches. The common directory contains and is addressed by the CPU requesting logical addresses, each of which is either a real/absolute address or a virtual address, according to whichever address mode the CPU is in. Each entry in the directory contains a logical address representation derived from a logical address that previously missed in the directory. A CPU request "hits" in the directory if its requested address is in any private cache (e.g. in L1 or L2). A line presence field (LPF) is included in each directory entry to aid in determining a hit in the L1 cache. The L1CA contains L1 cache information to supplement the corresponding common directory entry; the L1CA is used during a L1 LRU castout, but is not the critical path of an L1 or L2 hit. A translation lookaside buffer (TLB) is not used to determine cache hits. The TLB output is used only during the infrequent times that a CPU request misses in the cache directory, and the translated address (i.e. absolute address) is then used to access the data in a synonym location in the same cache, or in main storage, or in the L1 or L2 cache in another CPU in a multiprocessor system using synonym/cross-interrogate directories.

24 Claims, 16 Drawing Sheets

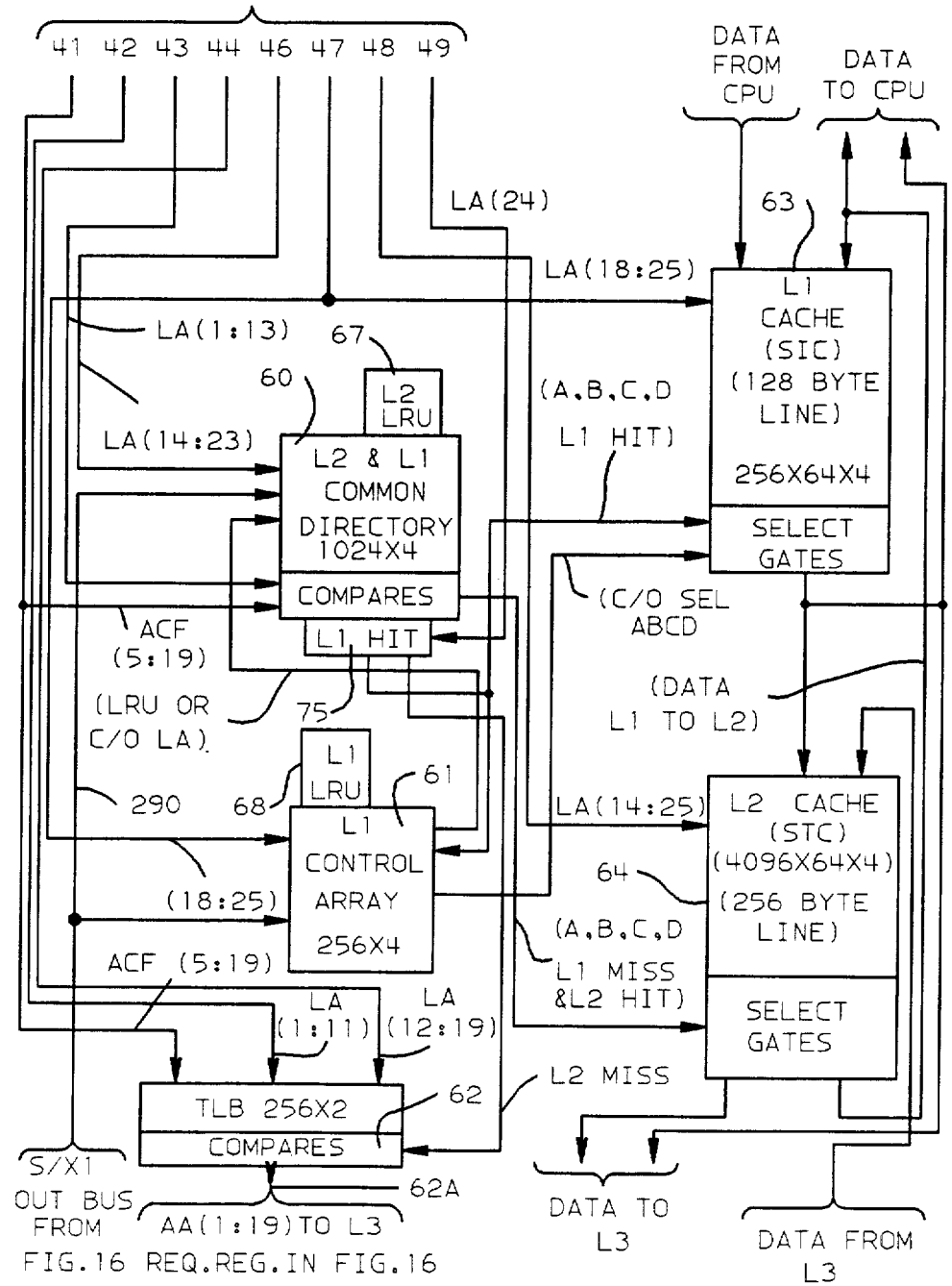
FIG. 3 (CACHE ARRANGEMENT)

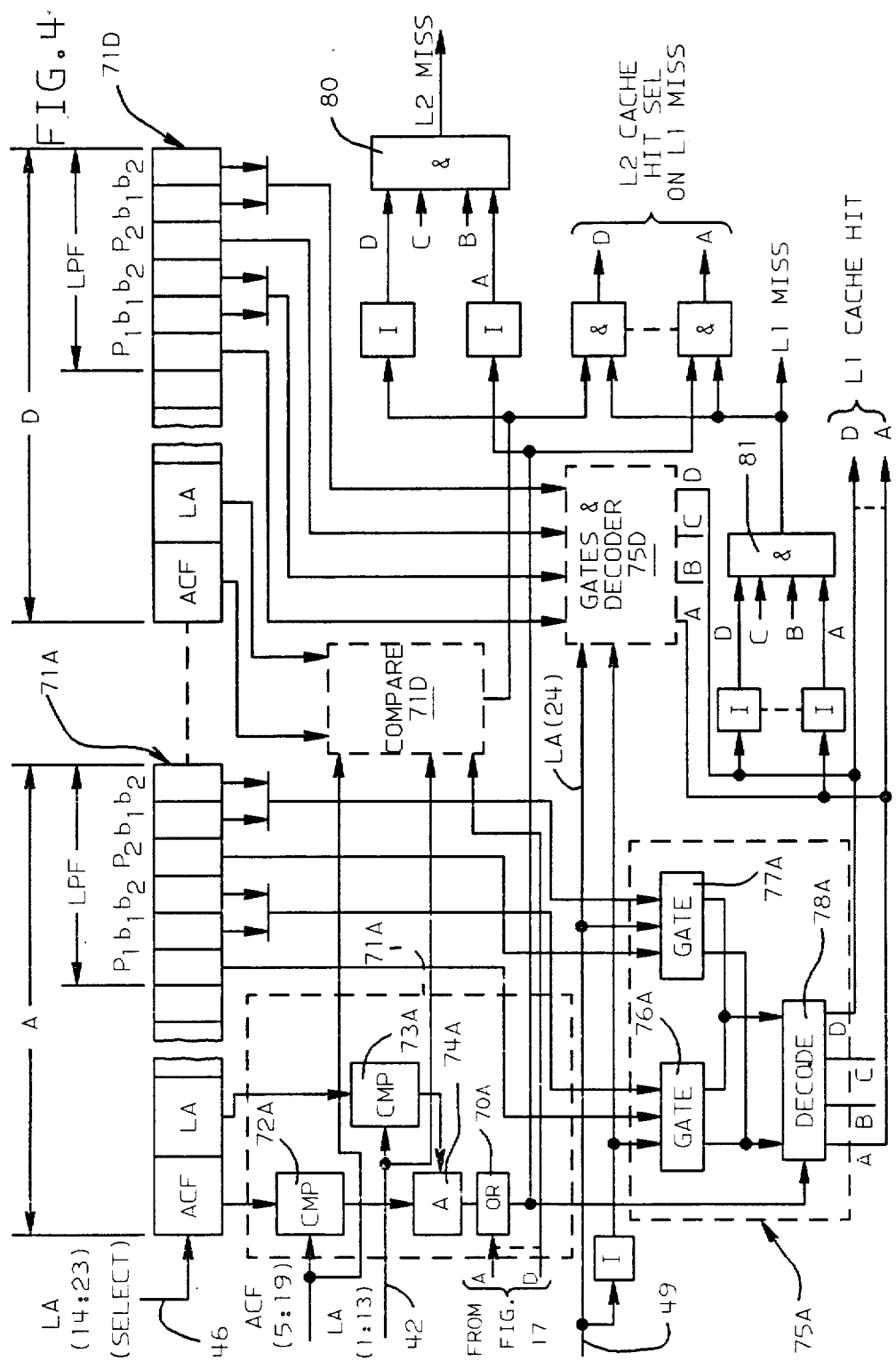

FIG. 5  COMMON DIRECTORY ENTRY
(IN FIG. 2)
| L2 LRU (3) | L2 I (1) | L2 EX (1) | L2 CH (1) | ACF (15) | LA (13) | L2 CM (1) | L1 LPF (6) |
|---|---|---|---|---|---|---|---|
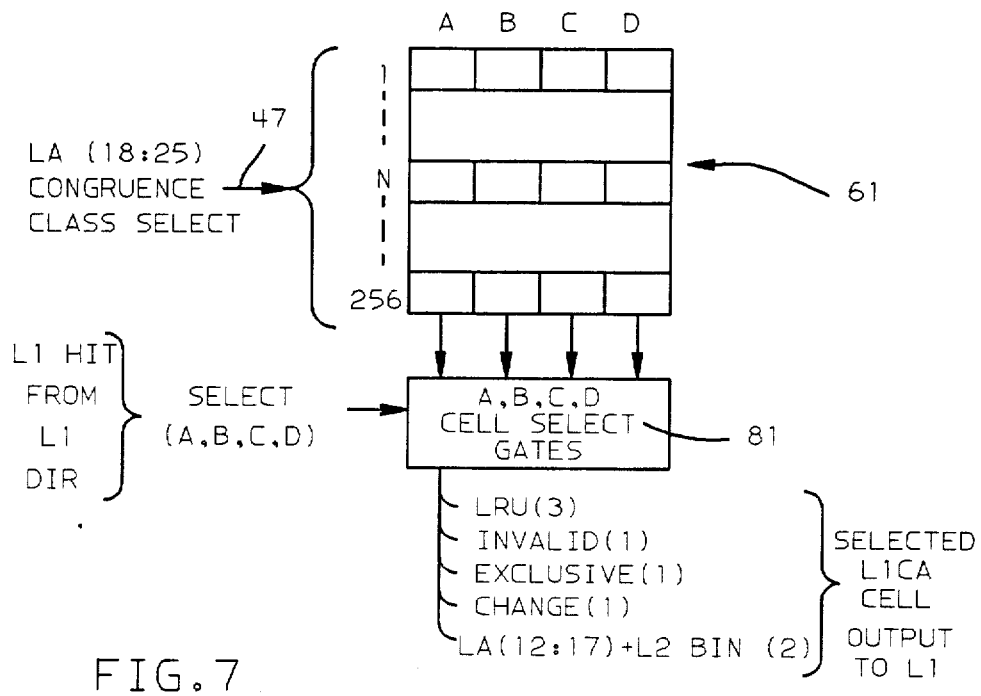
FIG. 6  L1 CONTROL ARRAY (L1CA)
FIG. 7  L1 CONTROL ARRAY CELL (L1CA)
(IN FIG. 2)
| L1 LRU (3) | L1 I (1) | L1 EX (1) | L1 CH (1) | C/O LA (6) | L2 BIN # (2) |
|---|---|---|---|---|---|

(L1 CACHE)

FIG.12 (CACHE ARRANGEMENT)

FIG.14

COMMON DIRECTORY ENTRY
(IN FIG.12)

| L2 LRU (3) | L2 I (1) | L2 EX (1) | L2 CH (1) | STO ID (7) | DAT OFF (1) | L2 LA (13) | L2 CM (1) | L1 LPF (6) |
|---|---|---|---|---|---|---|---|---|

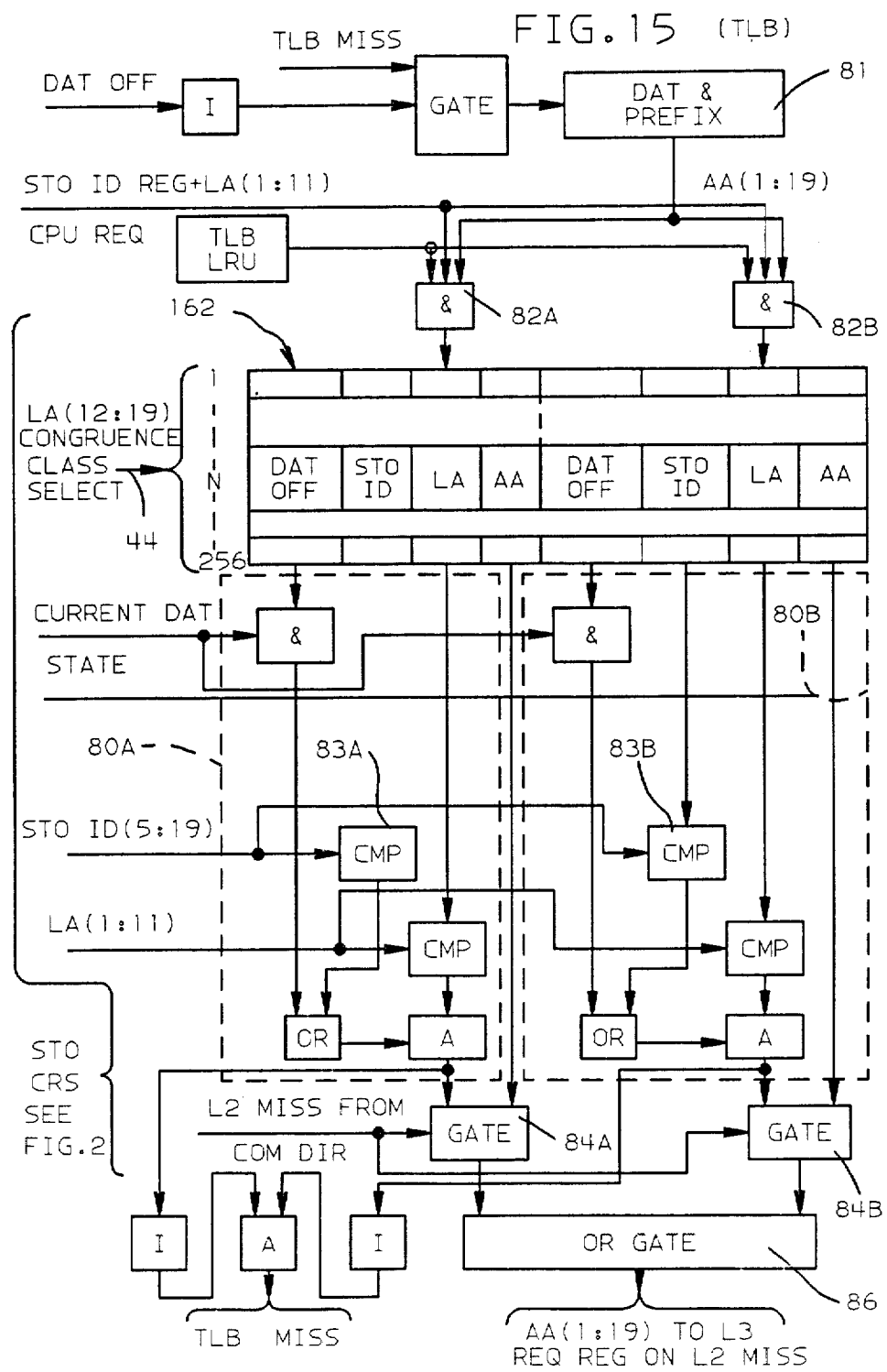

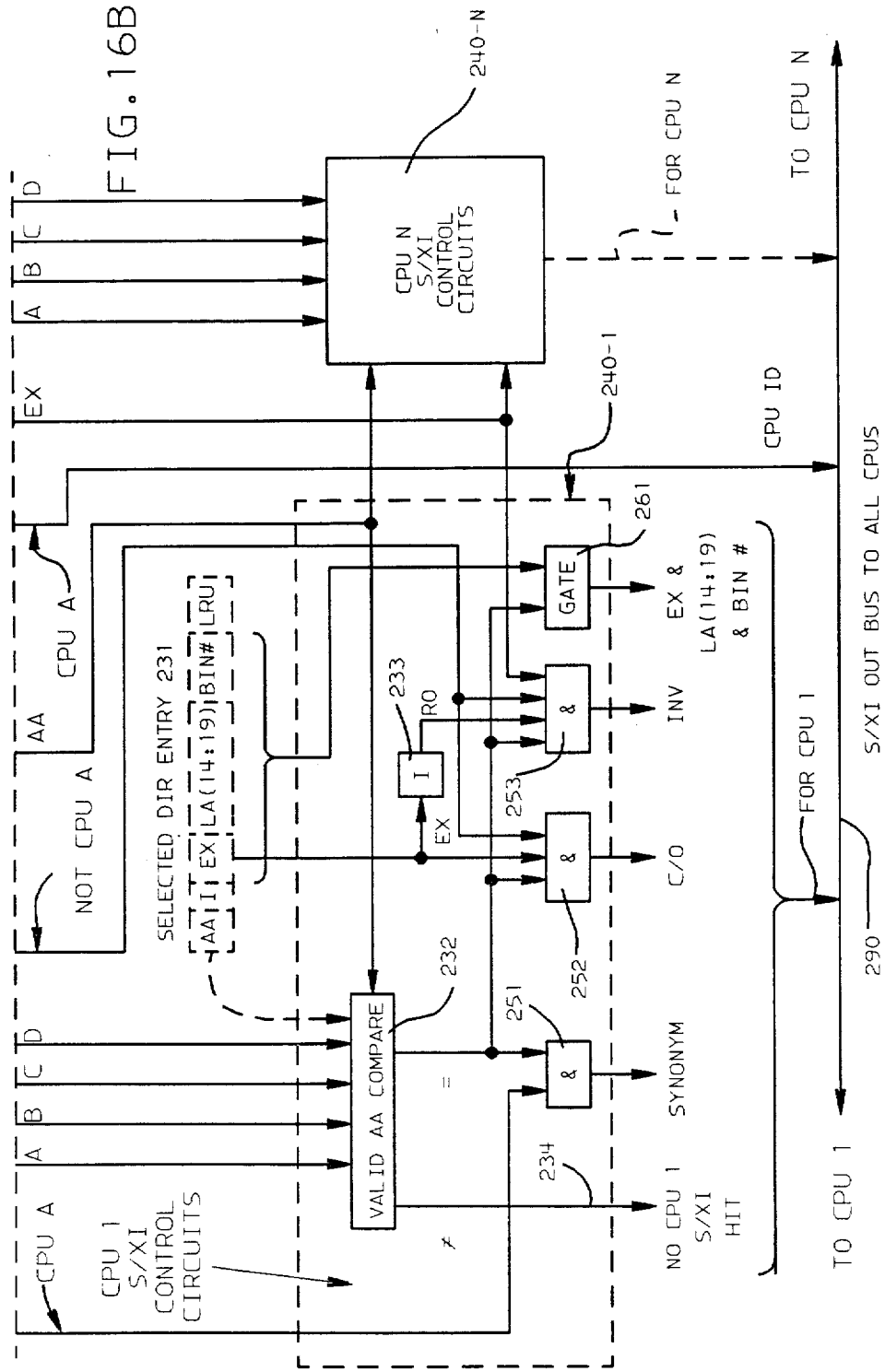

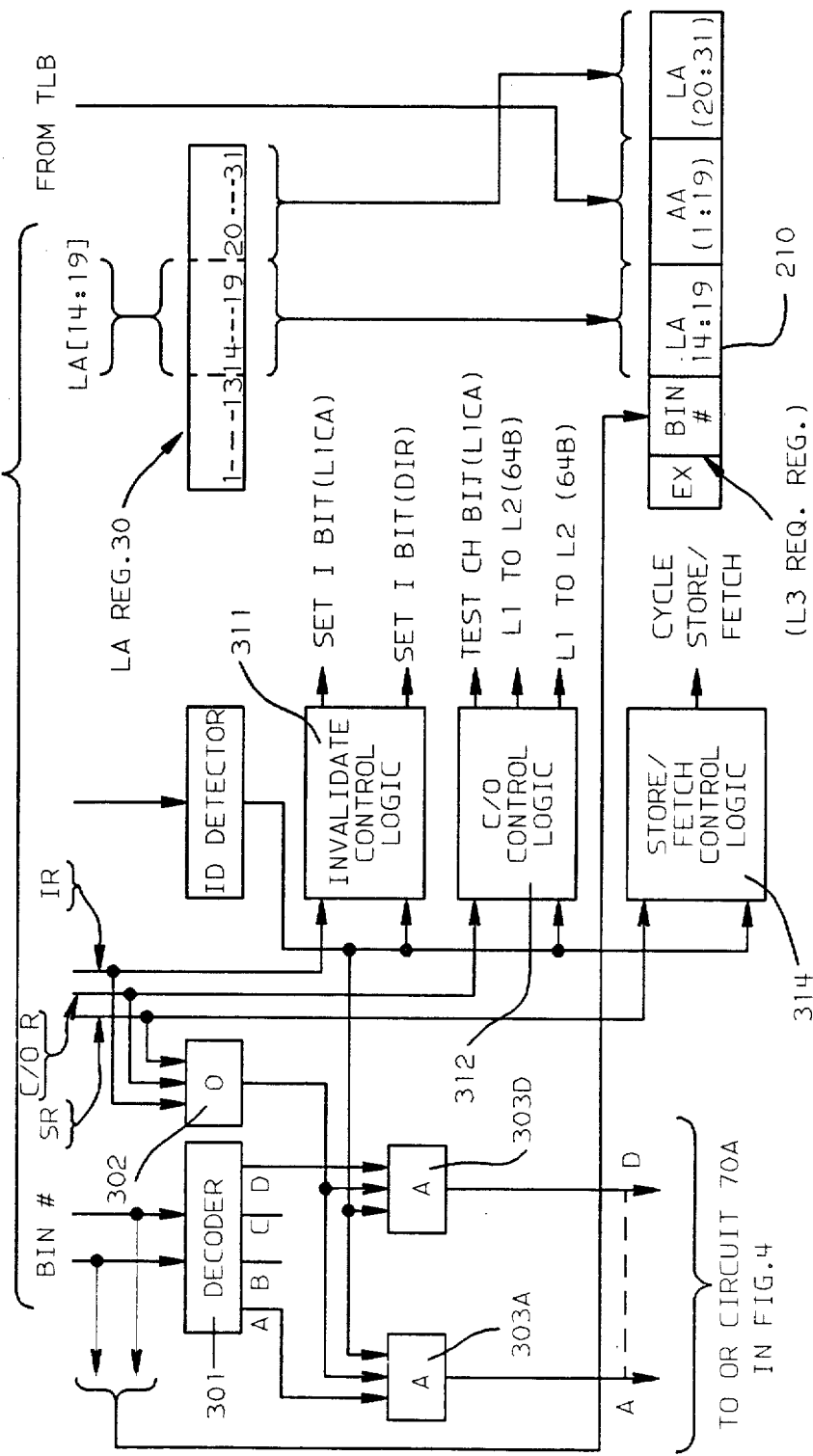
FIG. 17 CPU 1 S/X1 RESPONSE CONTROLS

VARIABLE ADDRESS MODE CACHE

This invention relates to data processing systems which contain a multilevel storage hierarchy, in which one or more levels contain a cache (i.e. high speed buffer) to speed up the access of data and/or instructions between a CPU and storage.

BACKGROUND

The prior art teaches data processing systems which contain a multilevel storage hierarchy having one or more caches, in which the cache in the lowest hierarchy level L1 is directly accessible (i.e. private) to a single CPU, in order to be in close proximity to the CPU for fast access. Each cache contains lines of data having a line length (i.e. byte length) convenient to the respective cache, wherein the different caches may have different line lengths. The prior art also teaches having a second level (L2) cache which may have a line length that is a multiple of the line length in each entry in the lowest level cache (L1).

In the prior art, main frame CPUs often include an instruction unit as a source of requested addresses, a translation lookaside buffer (TLB), an L1 cache and as the lowest hierarchy level, and an L2 cache and directory as its next hierarchy level.

Cache efficiency is important to system performance. An important parameter for measuring cache efficiency is the average time duration from when a storage request address is available from the CPU instruction unit until the requested data is available to the instruction unit. This duration is usually measured in numbers of machine cycles. Cache efficiency increases as this parameter decreases.

Conventional systems may operate in the following manner: A requested storage address from the instruction unit may be real, absolute, or virtual. If virtual, the page address (containing the requested address) may have been previously translated by dynamic address translation (DAT) means in the system which put the page's real or absolute address in a TLB entry, which is now accessed in the TLB by the requested address to obtain the translated address. A TLB miss is determined if no TLB entry contains the required translation, and then the requested virtual address is translated by DAT, which puts the translation into the TLB, from which it may be later accessed. Thereafter the requested virtual address only requires a TLB lookup and compare to obtain the corresponding translated real/virtual address from the TLB, until it is later replaced in the entry after a period of nonuse.

The DAT translates a virtual address to a real address, which is put into the TLB in a uniprocessor.

But if the CPU is in a multiprocessor, a prefix address is added to the translated real address to make it into an absolute address, and the virtual request's absolute address is then put into the TLB.

If the CPU requests a real address, no translation is done, but if the CPU is in a multiprocessor a prefix address is added to the requested real address to make it into an absolute address.

CPU requested real addresses have been handled in different ways by prior CPUs; some have put the real-/absolute address in the TLB in the same manner as is done with virtual addresses, while others have used a bypass path around the TLB to the L1 cache for an access attempt in the cache, in order to avoid using TLB space for an address not requiring translation.

The DAT operation in the IBM System/370 architecture uses a segment table descriptor (STD), comprised of a segment table origin (STO) and a segment table length (STL).

In systems using multiple address spaces, a STO is part of each requested virtual address for identifying the virtual address space containing the requested virtual address. STOs (or STO identifiers) have previously been put in each TLB entry as part of the virtual address. The STO in the accessed TLB entry must be compared with the STO provided with each requested virtual address in finding any TLB address translation. Thereafter only the translated address is used in accessing the requested data in the cache, and in main storage when needed. Some prior systems uses a STO identifier table to contain all recently used STOs and corresponding assigned STO identifiers that have fewer bits than the STO; and the STO identifier is put in the TLB instead of the STO to allow a smaller size TLB circuit array, since smaller arrays allow faster access.

In the conventional cache directory, a set associative arrangement was provided, in which a row in the cache directory (called a "congruence class") was selected by each address provided by the instruction unit (whether real/absolute, or virtual). And each row comprised a set of entries (called bins or bin identifier) which were handled associatively, i.e. each congruence class was set associative. In this manner the directory row selection was being made before TLB address translation was completed, in order to obtain selection of a cache congruence class before the TLB translated address was available, which speeded up operation on the critical cache path in the CPU.

In the conventional cache, only translated addresses are put into the cache directory. That is, a real/absolute address representation is provided in each used cache directory entry. This real address was read out of each directory entry in the congruence class selected by each instruction unit requested address. The set of directory readout real addresses arrived at respective comparator circuits at about the same time that the TLB translated address arrived at these circuits, and a simultaneous comparison was made to find which, if any, of the plural addresses from the selected congruence class matched the translated requested address, i.e. this is the set associative comparison for the cache.

This prior operation resulted in requiring a TLB hit before a L1 cache hit could be obtained. If a TLB miss occurred, the L1 cache determination had to wait until the TLB miss operation was completed by a DAT operation, with the L1 cache operation being restarted after the DAT operation for the current CPU request had put the new translation into the TLB. A TLB miss required a dynamic address translation (DAT), that may require two accesses of translation tables in main storage, which is relatively slow.

It is noted that known commercially used L1 cache directories do not contain virtual addresses. Their cache addresses are real/absolute addresses so they can be compared with TLB outputted real/absolute addresses. Virtual address values cannot be compared with real-/absolute address values, since a virtual address may be translated into any real page address available in main storage.

Accordingly, the conventional L1 cache directory requires two serially occurring compare operations before a corresponding L1 directory address can be found to exist or not exist, i.e. L1 cache hit or miss. If an L1 hit occurs, the data (usually a double-word) is accessed in the L1 cache and it is sent to the CPU.

U.S. Pat. No. 4,495,575 has a single buffer corresponding to an L1 cache, which is not a private CPU cache because it is accessed by I/O channels as well as a CPU. Its cache directory entries each have "sum data" comprised of a space ID and a block address which are compared to a space ID and a block address in the virtual address in a register 46 received from the CPU or channel. Upon a buffer miss, an address conversion table 61 supplies a real address to MM 22 to obtain the data.

In all prior cache systems, a L1 cache miss requires an access of the requested data from the next higher level in the storage hierarchy, which commonly has been main storage in large systems.

If a L2 level cache exists in the system, L2 is accessed instead of main storage to provide the requested data to both L1 and the CPU if L2 contains the data. If the L2 cache does not contain the requested data, main storage is accessed for it, with the access time for determin.ing the L2 cache miss being added to the overall access time for the requested data. A real/absolute address is conventionally used to access the L2 cache directory, which requires the output of the TLB when a virtual address is being requested by the CPU.

In all prior caches, the occurrence of a TLB miss may occur independently of a L1 cache directory miss. Fortunately most CPU requests (over 90%) hit in both the TLB and cache, which is the reason for the existence of the TLB and caches.

A basic requirement of L2 caches is that they must have a large size to be effective, such as several times larger than the L1 cache. Hence L2 has the likelihood of containing data from many more pages in main storage than does L1. However a fundamental problem may exist in that the TLB is not usually large enough to contain all the page translations representing the data existing in L2. The result is that even though a requested line of data may exist in the L2 cache, its TLB entry may have been replaced before the current request is made, so that a TLB miss results, and its related DAT operation must be completed for the TLB in such prior systems before the L2 cache can be accessed to obtain data already there.

In prior U.S. Pat. No. 4,464,712, the page-translating TLB entries correspond to page-size lines in the L2 cache, which has a L2 cache directory separate from the TLB (i.e. DLAT). Absolute-addresses outputted by the TLB upon each TLB entry replacement operation locate and control the settings of replacement-candidate flag bits R in the L2 entries to control the LRU replacement selection of line entries in the L2 cache directory. This requires a TLB/L2 relationship in which the L2 cache has an L2 line size equal to the TLB controlled page size (e.g. 4096 bytes).

SUMMARY OF THE INVENTION

It is the primary object of this invention to increase cache size privately available to a CPU while at the same time decreasing the critical path for cache accesses. The invention supports the CPU use of switchable mode addressing wherein the CPU can arbitrarily switch between virtual addressing and real storage addressing (such as occurs when using IBM S/370 logical addressing by "program status word" (PSW) that switches the "dynamic address translation" (DAT) state on and off.) The invention allows switchable mode addressing by the CPU to be easily handled by the cache.

It is a feature of this invention to provide an address mode indicator for each cache directory entry to indicate whether the entry represents a real/absolute address or a virtual address. This indicator enables the elimination of TLB operation from the critical CPU-to-cache access path even though the CPU uses switchable mode logical addressing.

It is a another feature of this invention to provide an address mode flag field with each cache directory entry to indicate whether the address represented in the entry is a real/absolute address not translated from any address space, or if it is a virtual address. Use of the address mode flag field eliminates the TLB operation from the critical CPU to cache access path when the CPU uses switchable mode logical addressing.

It is a still another feature of this invention to provide an address mode indicator with each cache directory entry (as an alternative to having any address mode flag field) by using a predetermined value, or range of values within an address space name in each cache directory entry to indicate when the address represented in the entry is: (1) a real/absolute address not translated from any address space, and the address space name field does not represent any address space name, or (2) a virtual address, and the address space name field represents the name of the address space containing the virtual address. This control over the address space name field content can eliminate the TLB operation from the critical CPU-to-cache access path when the CPU uses switchable mode logical addressing.

It is a further object of this invention to allow the use of plural levels of private caches to expand the cache size accessible to a CPU while eliminating the TLB operation from the critical path to all levels of private cache accesses for a processor request.

It is another object of this invention to provide a cache design arrangement that provides simplification of synonym resolution. This invention avoids the conventional exponential (i.e. 2 to the n power) increase in synonym resolution complexity as cache size is increased. Cache size is increased by increasing the number (n) of logical address bits in the cache address.

It is a still further object of this invention to eliminate the need for plural cache directories where plural levels of caches are used to improve the average CPU access time for storage requests.

It is a further object of this invention to avoid cache directory synchronization problems among plural levels of caches.

It is a another object of this invention to provide a single cache directory common to plural levels of caches private to one processor to reduce the cache directory costs and hardware requirements.

It is a further object of this invention to provide a single cache directory for plural levels of private caches for a processor in which each directory entry has an address mode field or indicator for indicating whether or not dynamic address translation (DAT) is used with the address represented in the cache entry.

It is a another object of this invention to provide a single cache directory for plural levels of private caches for a processor in which each directory entry represents a line of data or instructions in the highest level private cache and also indicates the location of any part of the respective highest level line in each lower-level cache.

It is another object of this invention to enable the DAT and TLB to operate in parallel while the CPU is accessing data or instructions in any level of the CPUs private caches.

It is a still another object of this invention to eliminate the use of TLB operations in a processor's critical path that accesses data or instructions available in any of the processor's private caches.

It is a still further object of this invention to eliminate the use of TLB operations in a processor's critical path for accessing data or instructions available in a first-level store-in cache of a processor.

It is another object of this invention to eliminate the use of TLB operations for a processor to use logical address requests, as long as the storage accesses requested by the processor are found in any of plural private caches of the processor.

It is a still further object of this invention to use TLB operations only when a requested storage access is not found in the one of plural caches private to the requesting processor.

It is a further object of this invention to provide a single directory to handle all plural levels of private caches, any of which may be a store-through cache or a store-in cache.

It is another object of this invention to provide a single cache directory to handle plural levels of private caches for a processor in which the lowest level is a store-in cache and the highest level is a store-through cache.

It is a further object of this invention to provide a single cache directory to handle two levels of private caches for a processor in which the first (lowest) level has a store-in cache and the second (and highest) level has a store-through cache.

It is another object of this invention to provide a control array for handling supplementary information required by a lowest level store-in cache (such as for handling its line castouts), while using a common directory for handling the CPU accessing information for the plural levels of private caches.

It is another object of this invention to provide a control array (associated with a common directory for plural levels of private caches) for identifying the set associative location in a respective private store-in cache level that contains a data line to be castout of that level.

It is another object of this invention to provide a control array (associated with a common directory for plural levels of private caches) for handling flagging requirements of a lower private cache level(s).

It is another object of this invention to provide a control array (associated with a particular cache level among plural levels of private caches managed by a common directory), in which the control array entries correspond to the entries in the common directory, and each control array entry contains a bin number field for indicating the set-associative location in the next higher level cache for locating the higher level line containing the respective lower level line.

It is a further object of this invention to provide a single directory that signals a cache hit for a processor request available in any of plural private caches of a CPU and accesses the requested data or instructions in the lowest-level cache containing the data.

It is a still further object of this invention to provide a unique system for detecting and using synonym cache entries.

It is a another object of this invention to provide a system for resolving and using synonym cache entries which may be in any or plural levels of a multilevel private cache system by using a cross-interrogation directory system of a multiprocessor.

It is a further object of this invention to provide a unique system for casting out and invalidating cache entries requested by another processor in a multiprocessor system.

It is another object of this invention to provide a system for uniquely finding cross-interrogation hits in any CPU in a multiprocessor for cast out or invalidation, in which cross-interrogation hits in the system are communicated by a cross-interrogation directory system that detects the hits.

This invention relates to a data processing system which contains a multi-level storage hierarchy, and may have plural hierarchy levels private to a single CPU (not shared with any other processor), in which the caches are in close proximity to each other and to the CPU. The lowest cache level L1 is the fastest level for accessing CPU requests, and L1 has the smallest storage capacity of all levels. The next higher cache level L2 is the next fastest level for accessing CPU requests, and L2 has a much larger storage capacity than L1. Other still higher cache levels, L3 etc., may also be provided to obtain a larger cache storage capacity, but they are slower levels for accessing CPU requests. Thus the CPU access time gets longer as an access request needs to go higher in the hierarchy levels to get requested data or instructions.

The respective cache size at each private hierarchy level is flexibly designed to containing any number of lines of data with a line length convenient to the respective cache. Each lower level private cache uses a line length which is a sub-multiple of the line length (e.g. in bytes) of its higher level private cache(s). Any sub-multiple may theoretically be used, and the sub-multiples may be different among different cache levels. Thus the length of each line in a L1 cache is a sub-multiple part of the length of each line in its L2 cache. That is, each L2 line is comprised of plural L1 lines, and each L1 line is a sub-multiple part of the L2 line. Hence the L2 line length may be several times the L1 line length.

A CPU request "hits" in the common directory if its requested address is for data available in any private cache of the directory, and the requested data is accessed in the lowest level (fastest) cache in which the requested data or instructions are available. A CPU request "misses" in the common direct if no hit occurs.

Each CPU request address (a switchable logical address) simultaneously addresses a congruence class in the common cache directory and a respective congruence class in each of the CPU's private caches. Any potential "hit" for the requested access is determined by the directory for the cache locations in these congruence classes.

The "common directory" is a cache directory common to all levels in a multilevel cache, in which each entry represents:

(a) a respective line in the highest level private cache, and (b) the location of each part of the line available in any one or more lower level private caches.

That is, corresponding parts in all private cache levels are located through a single entry in the common directory. The "common directory entry" manages the corresponding parts in all of the private caches. Thus each common directory entry: (a) represents a line in the highest level (largest) private cache (containing all line parts), and (b) keeps track of every part of that same line that may be copied into any other cache(s) in that hierarchy.

To keep track of all copied parts of each highest-level line, each common directory entry contains a line presence field (LPF) for enabling the entry to manage all of its line parts in all private caches. To do this, the LPF with each common directory entry indicates:

(1) each other cache level containing a copied part,
(2) which part of the line is copied therein, and
(3) the set-associative position in each other cache containing the part (if it is a set-associative cache).

Items (1) and (2) may be combined into one LPF indicator if there are only two private cache levels, and item (3) need not be used for any cache-level not using set-associativity.

The LPF is not needed in a directory that handles only a single private cache for a processor. Thus LPFs are used by this invention in a common directory servicing plural private caches.

Many large systems presently use the IBM System/370 architecture in which the CPU can switch address modes at any time between real/absolute address mode and virtual address mode, in which the interpretation of the effective CPU storage addresses in a program bing executed are controlled by the address mode currently existing. The CPU addressing mode can switch at any time between the virtual mode (e.g. virtual addresses with a STO, or STO identifier) and the real mode (e.g. real or absolute addresses without any STO, or STO identifier); this switchable type of addressing is called "S/370 logical addressing", and it is controlled by PSW bit 5, called the DAT mode bit.

In the invention, each valid cache directory entry must indicate the address mode used by the request which generated the entry. Therefore, the indicated address mode can arbitrarily vary from one directory entry to another for any current state of the cache directory.

CPU accessing of the hierarchy in this invention is to the lowest-level (fastest) cache containing the CPU requested data in its plural private caches. For example where there are two private caches L1 and L2, a hit in either cache avoids any use of the TLB in the critical path; that is, a miss in L1 but a hit in L2 avoids involving the TLB in the data accessing operation.

In a preferred form of the invention, each common directory entry contains a number of fields in addition to the LPF and the logical address representation field including: an invalid (I) field, a STO (or STO identifier) field, a change (CH) field, and a DAT ON/OFF field unless the STO field is uniquely controlled to additionally perform the DAT ON/OFF function. (For example, a STO value of zero may be used to indicate the special case of the associated logical address being a real or absolute address, which prevents the zero STO value from being an address space identifier.)

Other flag fields can be added to the directory entries to identify special conditions for the associated line of cache data, such as an exclusive/readonly (EX) field in the cache directories in an MP, and a common bit (C) to handle common virtual storage areas in an MVS environment.

The I field indicates if the directory entry represents any useable data in any of the plural caches; if on it indicates the entry does not represent any valid data, but if off it indicates the entry represents a valid line in at least the highest-level cache. The CH field indicates if the directory entry represented-data has been written-into (i.e. changed) in any of the plural caches; if on it indicates the represented data is changed, but if off it indicates the valid line has not been changed. The exclusive/readonly (EX) flag field (usually a single bit) is used in the cache directories of an MP to indicate whether the line represented by the entry can exist only in a single cache at a time for exclusive CPU access, or whether that line is allowed to be simultaneously represented in plural CPU directories to allow shared access by plural CPUs.

An intermediate-order group of bits taken from the middle portion of the requested logical address is used as a select address for selecting a candidate congruence class in the common directory and in each cache. The locations of all set-associative entries in each congruence class are predetermined, and they are readout of the directory as candidate entries when the congruence class is accessed.

In each readout candidate entry, the location of the I field, the address representation, the LPF and other entry fields is also predetermined.

The I field in each candidate entry is tested to determine if the requested line exist (i.e. is valid) in the highest-level cache. If the I field is on in all entries in the selected congruence class, the requested line is not in any private cache, and a cache miss is signaled. A cache directory entry is then assigned for the missed request. The congruence class for the new directory entry is determined by the intermediate-order group in the requesting address. One of the set-associative locations for the entry within that congruence class is assigned by a cache directory LRU replacement circuit. The I field in that entry is set on, and the entry content is generated, including an LPF with assigned field and subfields determining the location assignments for the required line in the highest-order cache and for each of its part(s) in each lower order cache. Simultaneously the required line fetch signals are sent to main storage. The fetched line and its required parts are copied into the assigned locations in all of the caches. This main memory line fetch uses the translated page address outputted from the TLB, and a low-order group of bits from the requested logical address defining the required page in the conventional manner.

If a CPU request finds the I field is off in at least one candidate entry, the requested data may be in the highest-order cache and may be in the one (or more, if they exist) lower-order cache(s). Then the address mode indicator or field is examined for each valid entry to determine if the entry's-represented address is real/absolute or virtual. If the entry's-represented logical address is virtual, its STO (or STO identifier) field and its logical address representation field are compared to the CPU request's STO (or STO identifier) and a high-order group of bits in its logical address, respectively. If the entry's logical address is real/absolute, the STO does not define any address space name in the comparison but only acts as a real/absolute indicator. If the compared fields are equal for any validly candidate entry, a cache hit exist for it.

The LPF must be examined in this cache hit entry to determine in which of the lower-level cache(s), if any, the requested data may be contained, and its set-associative location in its congruence class. To do this, a low-order bit (or predetermined group of bits) next to the intermediate-order group is also taken from the requesting logical address to locate the correct subfield (and sub-sub- field, if it exists) within the LPF in each read-out entry. A presence bit located at the beginning of this subfield is tested to determine if the requested line exist (i.e. is valid) in the lowest-level cache.

A lowest-order group of bits is also taken from the requested logical address and is used to select the requested data unit in the selected line.

If the line presence bit in the selected LPF sub-field is off, the requested line is not in the associated cache, and the requested line is accessed in a higher-level cache which is the lowest-level cache containing the requested data which is then copied from the higher-order cache into the lower-order cache.

Whenever the processor writes data into a low-level cache which is a store-in cache, the same data is not written into any higher-order cache. But if each higher-level cache is a "store-through" cache, whenever a line is castout of the low-level cache, it will be stored in each higher-level cache and in main storage.

Even when a TLB miss and a DAT operation occur while there is a cache hit in the directory, the cache access is obtained in the above described manner without involving (or waiting for) the DAT or TLB operations. The DAT operation for the TLB miss will occur in parallel with the cache accessing operations. Since the higher-level cache may hold lines from many more pages than the TLB can hold translations for, it is very possible that the translation will not be in the TLB for a page containing a line presently available in at least the highest-level cache. While the DAT and TLB are operating for a CPU request, the requested data for the same request may then be transferred to the CPU from the lowest-level cache having the requested data.

Thus, the requested data is accessed in the lowest-order (fastest) cache level in which the data is available.

In an example of two private cache levels, a line presence field (LPF) is included in each entry in the common directory to indicate which, if any, of the L2 parts (i.e. L2 sub-lines represented in the common directory entry) is currently available to the processor in the L1 cache, in order to aid in determining when a L1 hit occurs. Each LPF has a plurality of subfields for representing each L2 line in the L2 cache. Each L2 subfield represents a L2 subline in the addressed L2 line which may have been copied into a L1 line location in the L1 cache, whereupon the L2 subline also becomes a L1 line. And if a set-associative L1 cache is used, the LPF also contains an L1 bin number to select the set-associative location in the the addressed L1 congruence class which may contain the requested data. This L1 location will contain the L1 line having the requested data if the requested address "hit" in the common directory. A common directory "hit" requires both an address "hit" and a unique LPF "hit".

In the two level private cache example, the LPF in each directory entry may be comprised of a plurality of sets respectively corresponding to the associative sets found in the corresponding congruence class in the L1 cache. Each LPF set may be comprised of a plural bit field, in which one bit represents whether the respective L2 subline is present in the L1 congruence class and the remaining bit(s) in the LPF set combinatorially represent the particular set-associative L1 line containing the respective L2 sub-line.

The LPF for a respective L2 sub-line may represent any L1 set-associative line of the addressed L1 congruence class into which the respective L2 sub-line was copied (then the L2 sub-line also became a L1 line). The L2 sub-line copying is done by a fetch of the sub-line from the L2 cache into a LRU selected associative set location in the L1 cache.

In a further example, if there.are three private cache levels L1, L2 and L3 for a CPU, the LPFs in the common directory entries basically represent the location(s) in the L2 and L1 caches of sub-lines and sub-sub-lines of data in the L3 cache, which here is the highest level. The LPF in each common directory entry here comprises a sequence of LPF sub-fields representing the presence of the respective L3 sub-lines that presently exist in L2 line locations. They are set upon a sub-line fetch from the L3 cache to the L2 cache, involving the copying of a selected L3 sub-line into into a selected L2 line location. Each LPF sub-field has a L2 presence flag bit to indicate if the respective L3 sub-line was copied into the L2 cache, and also has L2 set-associative bits indicating its set-associative location in the addressed L2 congruence class. Each LPF L2-associating subfield further has a sequence of L3-associating sub-sub-fields corresponding to respective L3 sub-sub-lines existing in the L1 cache. Each LPF sub-sub-field has a L1 presence flag bit to indicate if the respective L3 sub-sub-line was copied into the L1 cache, and also has L1 set-associative flag bits indicating its set-associative location in the addressed L1 congruence class. Hence each L3 sub-sub-field represents a multiplicity of L3 sub-sub-lines, any one of which is copiable into a line location in the L1 cache. If the L3 sub-sub-field settings indicate a requested sub-sub-line is not in L1 but is in L2, the sub-sub-line is fetched from the L2 cache, and not from the L3 cache, because this is the fastest way to access the requested data for the CPU. That is, the copying into L2 from L3 may have been done at an earlier time for a different cache miss. However if the L3 sub-sub-field settings indicate a requested L3 sub-sub-line is not in L1 or L2, the sub-sub-line is fetched from the L3 cache into both the L2 and L1 caches.

The number of private cache levels may be theoretically increased by any amount in the above described manner. The complexity of the LPF accordingly increases exponentially as the number of private cache levels increases.

Thus this invention allows the CPU to access its cache using switchable logical addresses while TLB translation accessing is being done in parallel for the same CPU requests.

A synonym and/or cross-interrogation directory (S/XI) arrangement is provided for proper functioning of the common directory cache system. A synonym (S) directory is provided for each CPU, and it also can function as a cross-interrogation (XI) directory when the CPU is provided in a multiprocessor system. Upon a TLB miss the real/absolute address outputted from the TLB is used to address the S/XI directory to locate a congruence class, which may contain set-associative entries. Each entry in the S/XI drectory corresponds to an entry in the common directory, but the (S/XI) congruence classes do not correspond to the cache directory congruence classes because the cache congruence classes are mapped by logical addresses while the S/XI directory congruence classes are mapped by real/absolute addresses.

When the LA and real/absolute address are related (as is the case with cache misses), the different congruence classes in the common directory (mapped with LAs) and in the (S/XI) directory (mapped with real/absolute addresses) can be found in the different directories. Then any directly related set associative entry in each of these directories is located by a set-associative comparison in the respectively addressed congruence class using the high-order bits of the respective address.

However there are situations where the absolute address is known, but the corresponding LA is not known, or visa versa. This is the case with synonyms and XI requests. The bin number concept in this invention is used to solve this problem. (The bin number concept is also used to solve the set associative entry location problem occurring with cast outs from the L1 to L2 cache, in which no real/absolute address was involved with the LA being used and the bin numbers in the found L2 entry are used to locate the L2 sublines corresponding to the castout L1 entry.)

A bin number is provided in each (S/XI) entry in order to locate the required set-associative entry having a S or XI hit in the (S/XI) directory for locating the required L2 line, after a (S/XI) hit entry has been found using a real/absolute address in any S/XI directory. An immediate field of the logical address and the bin number field in the S/XI entry then defines the congruence class and the set associative location where the required entry exists in the common directory of the CPU associated with the respective S/XI directory having the S or XI hit. The bin number and the CPU identification for the hit S/XI directory can then find the correct L2 set-associative entry in the common directory from which its LPF can be used to locate the required entry(s) in the L1 cache for a XI induced castout. Then its LPF bits are examined to locate the data line in the next lower level cache that contains the requested data.

The distinction between a synonym hit and a cross-interrogate hit is determined by whether a hit occurs in the S/XI directory associated with the CPU making the particular request or with the S/XI directory associated with another CPU. It is a synonym hit if it occurs in the S/XI directory associated with the CPU making the particular request, and it is a cross-interrogate hit if the hit occurs in a S/XI directory associated with another CPU. In a uniprocessor there is only one S/XI directory which acts as a synonym directory for CPU requests, but acts as an XI directory for channel requests.

In the case of a synonym hit in the S/XI directory associated with the CPU originating the request, a L1 discrimination bit in the requesting LA (e.g. bit 24) locates the particular L1 entry in the found L2 line. In the case of a cross-interrogate hit in a S/XI directory, an invalidation or castout is required of all hit L1 lines in the found L2 line in the cache of the CPU receiving the hit; invalidation occurs when an unchanged line held in its cache readonly or exclusively is hit by an exclusive request, and a cast out occurs when a changed line is hit by an exclusive request. No invalidation or castout is required of an L1 line hit by an readonly request, regardless of whether the L1 line was held in its cache readonly or exclusively; but if it was held exclusively, it is changed to readonly state.

BRIEF DESCRIPTION OF THE DRAWINGS

FIG. 3 illustrates the multilevel cache, its directory arrangement, and TLB controls used in the preferred embodiment.

FIG. 4 illustrates the circuits supporting the common directory operation in the preferred embodiment.

FIG. 5 shows detailed structure for any cell in the common directory shown in FIG. 3.

FIG. 6 shows the structure for the L1 control array shown in FIG. 3.

FIG. 7 shows detailed structure for any cell in the L1 control array shown in FIG. 3 or 6.

FIG. 14 illustrates an example of any cell in the common cache directory found in FIGS. 12 and 13.

FIG. 15 shows the general structure for the translation lookaside buffer (TLB) shown in FIGS. 3 and 12.

FIGS. 16A and 16B show a synonym/cross-interrogation (S/XI) directory arrangement used by the embodiments in a multiprocessor environment.

FIG. 17 illustrates synonym/cross-interrogation (S/XI) response controls found with each CPU used by the embodiments in a multiprocessor environment.

DESCRIPTION OF THE PREFERRED EMBODIMENT

Abbreviation and Definition Index

Figure 1:
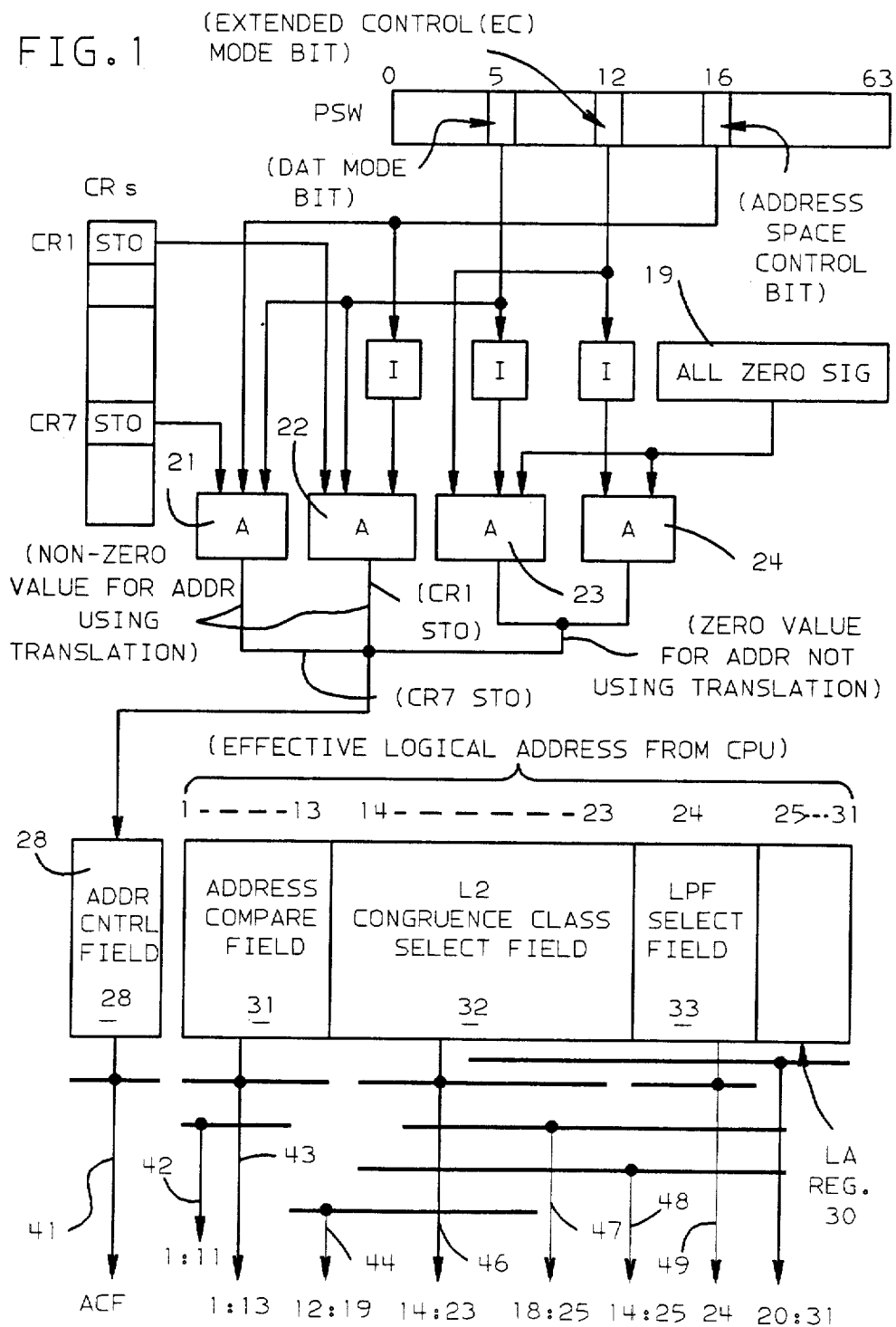
FIG. 1 illustrates the CPU means for selecting storage addresses in the preferred embodiment.

In this specification abbreviations are used to save space and reading time. The following is an index of abbreviations and their definitions:

AA: Absolute Address. The AA is formed from an RA by the CPU with prefixing hardware. AAs are used in multiprocessors.

ACF: Address Control Field. The ACF is a CPU provided field switched between a zero value when the CPU is requesting a real address, and a non-zero STO value when the CPU is requesting a virtual address.

Address Concatenation. The expression "STO(5:19)-+LA(1:11)" means, for example, that the 15 STO bits are concatenated with the 11 LA bits to form a 26 bit binary number.

AG: Address Generation. Address arithmetic usually summing a base, index and displacement of an operand address to generate an effective address.

BCE: Buffer Control Element. The BCE is that portion of a CPU which contains the cache arrays, their directories, the TLB (or DLAT) and their control logic.

Bin#: A field in each L1 Control Array entry corresponding to a L1 entry in the common cache directory for finding the set-associative location (A, B, C or D) in the common directory containing that part of a L2 line containing the L1 line. The bin# is used for controlling castouts of changed L1 lines to the L2 cache, e.g. after a L1 cache miss or a cross-interrogate request from another CPU.

Cache: A high speed buffer physically located in close proximity to a CPU for storing "lines of data" containing instructions and/or operands most recently fetched from main memory. A line (or block) fetched into the cache will include a number of instructions or operands in the immediate address proximity of the instruction or operand requested from main memory by the CPU. A "private cache" is dedicated to use by one CPU, except for cross-interrogate requests in a multiprocessor system.

C/O: Cast-Out. A cast-out line from a cache.

CMP: Compare. It is used to designate hardware compare circuits.

DAT: Dynamic Address Translation. DAT is turned on/off by the setting of bit number 5 in the Program Status Word.

LA: Logical Address. Any address provided by a CPU, whether a RA (i.e. untranslatable) or a VA (i.e. translatable), which may be controlled by the state of the DAT bit in the PSW.

LPF: Line Presence Field. A field in each common directory entry indicating the L1 cache location represented by the entry. The directory entry basically indicates the L2 cache location containing the L2 data line having that L1 line as one of its parts.

LRU. Least recently used, or partitioned least recently used (PLRU), circuits. The LRU and PLRU algorithms determine which line of data in a cache is to be "cast out" to a higher level in the hierarchy, in order to make space for a new line not currently in the cache directory. The cache directory entry of the castout line is invalidated, and that entry may be reassigned for a new line to be put in the cache.

RA: Real Address. The CPU provides RAs with DAT off which do not use translation, and the CPU provides VAs with DAT on which are translated to generate RAs.

SA: Storage Address. It is the address issued by a CPU for an operand or instruction in the main memory of a system.

STO: Segment Table Origin. The STO bits are obtained from CR1 or CR7 (bits 5-19) for primary and secondary storage mode.

TRAD: Translated address. It is obtained from DAT or a TLB as a result of current or previous DAT operation.

TLB: Translation Lookaside Buffer (sometimes called DLAT: Directory Look-Aside Table).

UTRAD: Untranslated address. It is the effective address requested by a CPU, and it may be a VA, or a RA.

VA: Virtual Address. The CPU generates VAs with DAT on.

A major cause of loss of performance in general purpose data processing systems is the so called "storage penalty". This occurs in the normal execution of a program when the access time to main memory (also called main storage) is substantially longer than a few machine cycles in order to fetch instructions and/or operand data from main memory. The storage penalty becomes increasingly costly in general purpose computer systems employing virtual storage, because several main storage references (and therefore several invocations of the storage penalty) are required to access tables which are used to perform the virtual to real dynamic address translation (DAT). After DAT, the resulting real address (RA) is becomes known to the CPU and the store/fetch operation in main memory may then proceed.

Computer architects have evolved a number of mechanisms to substantially reduce the storage penalty. Three commonly used mechanisms for reducing the storage penalty are: caches and their cache directories, and TLBs. These mechanisms rely on a well established principle called the "locality of reference" principle. Stated simply, once an element of data (instruction or operand) is requested from a memory, a line of data is accessed containing that element (and other elements of data in the immediate address proxiity to the referenced element). The other elements have a high probability of being referenced in the immediate future by the CPU.

Once a data line is entered into a cache from main memory, subsequent references to data elements contained within the line are accessed from the cache, thereby avoiding the storage penalty.

Prior cache systems have been designed with more than one "level" of a storage hierarchy. An L1 (first level) and L2 (second level) cache hierarchical arrangement has been used. In such a hierarchy, the CPU first attempts to locate CPU requested data in the L1 directory (for the smaller capacity, higher speed cache). If the data is not present in the L1 cache (i.e. L1 miss), the CPU will attempt to locate the data in the L2 cache (a larger capacity, lower speed cache, compared to L1). A miss in L2 necessitates a main memory (L3) fetch. But a hit in L2 results in a storage penalty significantly smaller than the storage penalty of a fetch from L3.

Two embodiments are shown in this specification, which differ in the way the entries in the directory differentiate between translatable and untranslatable types of addresses represented therein. A first (and preferred) embodiment shown in FIGS. 1, 2 and 3 uses a zero or non-zero address control field (ACF) in each entry, in which a non-zero ACF is a STO value, to differentiate between translatable and untranslatable types of addresses. A second embodiment shown in FIGS. 11 and 12 uses the DAT ON/OFF field in the current S/370 PSW in the CPU as a zero or one valued address control field in each entry, in addition to any STO, to differentiate between translatable and untranslatable types of addresses.

Both embodiments have a "common cache directory" (CCD) for accessing data in a two-level cache organization private to a high-performance central processor (CPU). The CCD "remembers" which "lines of data" are currently resident in both the L1 and L2 caches. The CCD contains only untranslated address bits of previously requested CPU addresses. A "local search" within the CCD is executed in hardware to determine if a line containing requested data is in the L1 or L2 cache, and if so, the CCD generates a signal to "gate" the addressed operand to the CPU from the L1 cache (if available in L1), and if not, then from the L2 cache (if available in L2).

(The common cache directory avoids a common problem in prior cache organizations from which the CPU can request both untranslatable and translatable types of logical addresses. For example, the TLB and L1 cache previously have had their arrays addressed with bits of an untranslated logical address (virtual or real), while any L2 cache was addressed with bits of a translated logical address (real or absolute). But each level previously had its respective cache directory typically containing only translated (real/absolute) address fields. A cache hit could only be determined after a translatable logical address had its translation completed, unless the requested logical address was a real address, in which case the TLB was bypassed. Thus the compare and select logic within the TLB was based on virtual addresses, whereas the compare and select logic within the L1 cache directory (and within any L2 cache directory) had to wait for the completion of address translation.

This prior way of requiring both translated and untranslated forms of the same address to determine a cache hit created considerable complexity to the prior hardware for "sorting out" what is virtual and what is real, and modifying the addressing paths within the cache system accordingly.)

The common cache directory (CCD) of this invention uses only a single form of the switchable logical addresses, which is the untranslated form of all CPU requested addresses (whether or not it is translatable) for accessing both the L1 and L2 caches. The common directory combines the L1 directory, the L2 directory, and some of the functions of the TLB. The requested form of each logical address (regardless of its actual type) is used uniformly in cache operations without translation, both: (1) within the entries in the common cache directory, and (2) to address the common cache directory, the L1 cache, the L2 cache, and an L1 control array. This single form for the variable addresses leads to a simpler cache addressing structure, greater economy of hardware due to array consolidation, and higher performance due to reduced hardware in the critical cache path, thereby reducing the cache cycle time.

In FIG. 1, circuits are shown for switching the address type between untranslatable and translatable types, in which the address type is indicated in an address control field (ACF) 28, which is associated with a logical address register 30, in which a non-zero ACF value indicates a translatable LA is in register 30, and a zero ACF value indicates an untranslatable LA is in register 30.

A unique structure (in which only untranslated addresses are represented) is provided in the common cache directory of each embodiment. The elimination of address translation from cache accessing provides a fast critical path for both real and virtual address requests from the CPU to obtain L1 and L2 cache accesses. An L2 access is started simultaneously with a L1 access, and is completed if the requested data is not obtainable from the L1 cache.

FIG. 1 shows unique hardware provided for the common directory to differentiate untranslated and translated (real and virtual) addresses. The address control field (ACF) is set to indicate whether a requested logical address in register 30 is a translated or untranslated address. ACF field 28 is a multiple bit field which is set by the output of AND gate 21, 22, 23 or 24. A zero output indicates the logical address in register 30 does not require translation (RA or AA), and a non-zero output indicates a logical address requiring translation.

In more detail, AND gates 23 and 24 receive an all zeros signal from a source 19, which may be a microcode source in the CPU. All of the gates 21-24 are controlled by one or more of the control bits in a program status word (PSW) currently in control of the CPU. They include a DAT mode control bit 5, an extended control (EC) mode bit 12 and an address space control bit 16. The PSW and its content including these bits, is described in the IBM System/370 Principles of Operation (Form No. GA22-7000-8), e.g. beginning on page 3-14.

The EC mode bit 12 controls whether AND gate 24 outputs an all zero signal, which it does if bit 12 is off indicating the basic mode (equivalent to the S/360 mode of operation). AND gate 23 provides the all zeroes output when the EC mode bit is on, which means that the system is operating with the S/370 architecture. Also, a DAT mode bit 5 conditions the operation of gate 23 due to the inverter inputting that signal to gate 23 when bit 5 is off indicating that DAT is off, so that gate 23 outputs an all zero signal.

Gates 21 and 22 provide non-zero value signals for indicating logical addresses in register 30 which use translation, these are addresses which require the use of a segment table and a page table in main memory. Gate 22 outputs a segment table origin (STO) for locating the segment table in main memory. A STO is provided from a control register (CR1) to AND gate 22. It is enabled by: DAT mode bit 5 indicating DAT is on, the EC mode bit 12 is on, and the address space control bit 16 is off. The AND gate 21 outputs the STO from CR7 when the DAT mode bit 5 is on and the address space control bit 16 also is on.

The output of AND gates 21-24 is dot-ORed to provide a signal to the ACF register 28, which is capable of representing a STO, but this signal does not represent a STO if it is all zeroes which indicates that the associated logical address does not use translation and hence is either a real or absolute address. The associated logical address in register 30 is the effective logical address, which is the computed form for an operand address.

Figure 2:
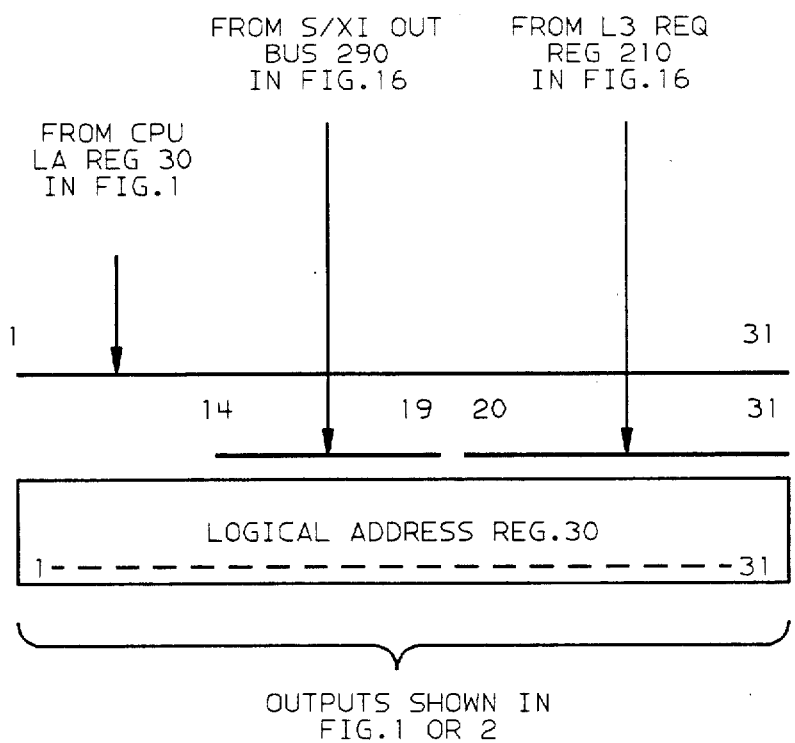
FIG. 2 represents different sources in a system which provided a logical address (LA), or parts thereof in the preferred embodiment.

FIG. 2 illustrates alternate inputs to LA register 30, of which the logical address input from the CPU (by in-gating bits 1-31) is used in the operation described thus far. The other inputs to register 30 are provided by synonym and cross-interrogate directory circuits that control both the L1 cache accessing of synonym entries to obtain the data requested by the local CPU, and the invalidation and cast-out of L1 cache entries at the request of another CPU.

All of fields 41-49 are gated out simultaneously to FIG. 3 within a single machine cycle to directory 60, cache 63, L1 control array 61, TLB 62, L2 cache 64, LRU circuit 67 and LRU circuit 68.

FIG. 3 receives the signal outputs from FIG. 1. FIG. 3 has a single cache directory 60 that operates in common for controlling the accessing of both L1 and L2 private caches 63 and 64. Private caches have the advantage of avoiding contention between processors makin storage requests. Each entry in the common directory can represent a L2 line in a corresponding location in the L2 cache. The same entry also represents any or all parts of the L2 line that are available in the L1 cache.

Thus in FIG. 1, the addressing structure enables each untranslated CPU requested address to address in parallel and in a uniform manner the common directory 60, the L1 cache 63, the L2 cache 64, and the TLB 62. Common cache directory 60 serves as the directory for both the L1 cache 63 and the L2 cache 64 and eliminates the need for separate cache directories.

The cache examples in FIG. 3 (or FIG. 12) are:
L1 cache 63:
  64K byte capacity
  4W set associative 128 byte line
64 byte data bus to L2 and L3 and CPU
"store-in" cache
L2 cache 64:
 1M byte capacity
 4W set associative
 256 byte line
 2 L1 lines per L2 line
 64 byte data buses to L1 and L3 and CPU
 "store-thru" cache The embodiment shown in FIGS. 1, 2 and 3 has a common cache directory 60 in which each entry has the exemplary format shown in FIG. 5. The embodiment shown in FIGS. 11 and 12 has a directory 160 in which each entry has the exemplary format shown in FIG. 14.

In FIG. 1 the output fields from ACF register 28 and LA register 30 are provided on a plurality of buses 41–49. The various buses 41–49 each represent a selected field having boundary bit positions indicated by two values separated by a colon symbol, except where there is only a single bit such as in the case of the LPF field 33 providing only bit 24.

The particular output fields of FIG. 1 are provided for the first embodiment and can easily be changed to accommodate different size addresses, or different size caches or different size common directories. Thus, in FIG. 1, the defined fields in register 30 are to accommodate the particular size arrays in directory 60, and caches 63 and 64 shown for FIG. 3. Buses 41, 43 and 46 are used for determining L2 hits in directory 60 with its comparators fields. Select field 32 is outputted on line 46 for addressing directory 60 in order to select a particular congruence class therein. The ACF output on lines 41 and compare field 43 are also provided to the compare section of common directory 60 to select an entry (A,B,C, or D), if any, in the congruence class for determining an L2 hit in the directory. The LPF select field 33 is outputted on lines 49 to directory 60 for determining if there is an L1 hit when an L2 hit is determined.

FIG. 5 illustrates the fields in each combined directory entry, which has the following fields (the values in parenthesis are the number of bit positions that a field may occupy in the embodiment):

LRU field: represents the LRU state of the respective L2 line in its congruence class in the L2 cache represented by the respective entry.

I field: represents the invalid/valid state of the respective L2 line represented by the respective entry.

EX field: represents the exclusive/readonly state of the respective L2 line represented by the entry in the L2 cache.

CH field: represents the changed/not changed state of the respective L2 line represented by the entry in the L2 cache.

CM field: represents whether the respective L2 line represented by the entry in the L2 cache is in a page in a common or private virtual address space.

ACF field: has a zero value when the entry represents a real address, and is a non-zero STO value when the entry represents a virtual address. The ACF field was derived from the CPU request from which the entry was generated and is used by the directory compare circuits.

LA field: contains high-order bits of the logical address from which the entry was generated for use by the directory compare circuits.

LPF field: line presence field in each directory entry has 6 bits that indicate which, if any, of either part of the L2 line is available in the L1 cache. The bit positions in each LPF in this embodiment are defined as follows

| BIT POSITION | BIT NAME | LPF FUNCTION |
|---|---|---|
| 1 | P | Presence bit for part 1 of L2 line. |
| 2 | b1 | b1&b2 encode the position of part 1 |
| 3 | b2 | of the L2 line in the L1 cache. |
| 4 | P | Presence bit for part 2 of L2 line. |
| 5 | b1 | b1&b2 encode the position of part 2 |
| 6 | b2 | of the L2 line in the L1 cache. |

The unit of data selected for "exclusive" allocation and control is an L2 line in both embodiments.

The least recently used (LRU) circuit 67 generates the L2 LRU field content in each directory entry accessed in each of the the described embodiments. The L2 LRU fields are updated in all entries in a L2 congruence class when any entry in the class is accessed. When L2 misses occur in the directory, new entries are made in it to represent a new data line put into the L2 cache. During a cache miss, all the fields in the selected congruence class are examined to find which entry to assign to receive a new entry to be generated for the CPU missed request. In this manner, the LRU algorithm determines which directory entry (and its corresponding line of data in L2) may need to be "cast out" to main memory (L3) in the hierarchy, in order to make space for a new entry before the content of the new entry can be written into the directory. (A cast-out from the L2 cache is required only when L2 is operated as a store-in cache. If L2 is a store-thru cache, then no cast-out is required after the LRU designation for the new entry.)

FIG. 4 represents the common cache directory 60 and shows an example of a selected one of its 4-way set-associative congruence classes. The compares in directory 60 are illustrated as four comparator circuits 71A–D for respectively comparing each of the four entries in the selected congruence class with the ACF field and LA field 1:13. Each compare circuit 71 comprises sub-compare circuits 72 and 73 which are combined in AND circuit 74. When AND circuit 74 provides an output signal, it indicates an equal comparison that determines the respective entry has a cache hit. When AND circuit 74 does not provide an output signal in response to a congruence class selection, it indicates an unequal comparison that determines the respective entry does not have a cache hit. If the ACF value is zero (meaning that the CPU request is a non-translatable address), a directory entry must have a zero ACF value to be able to provide an equal comparison. If the ACF value is non-zero (meaning that the ACF is a STO, the CPU request is a translatable address), a directory entry must have the same non-zero ACF value to be able to provide an equal comparison. The outputs of AND circuits 74A–D signal if there is a L2 cache hit in the selected congruence class. An L2 miss signal is generated in FIG. 4 by an AND circuit 80 which receives the inverted outputs of AND circuits 74.

In this manner, each of the cache directory compare circuits automatically operates under control of the current ACF signal to determine within the comparison whether it occurred between: (1) a translatable LA and an untranslatable entry-represented address (UERAD), (2) an untranslatable LA and a translatable entry-represented address (TERAD), (3) an untranslatable LA and an UERAD, or (4) a translatable LA and a TERAD. This invention requires that comparison (1) or (2) always be declared an unequal comparison, even though the compared LA values are equal. Only comparison (3) or (4) may be declared an equal comparison when the compared LA values are equal. Accordingly a L2 cache miss is determined whenever the requested LA and each of the TERADs in the selected congruence class have different translation characteristics, regardless of whether any of their TERADs equal the requested LA.

Whenever an L2 cache hit is determined, the directory 60 must determine whether a L1 cache hit exists. In FIG. 3, a L1 cache hit is determined by operation of the L1 hit determination circuitry 75 when a L2 hit is determined by the output of its respective AND circuits 74. Circuitry 75 uses the LPF select field 33 from FIG. 1 from which it is signalled on line 49 and is used in the directory in FIG. 4 to locate the part of the LPF needed for determining if any L1 cache hit exists. If a L1 hit exists, a signal is outputted on one of four L1 cache hit signal lines A, B, C or D to select the correct data line of the four data lines in the congruence class currently being addressed in L1 cache 63 by the LA bits 18:25 being provided on signal lines 47. The activated one of the four data lines A, B, C, & D in the required L1 congruence class is thereby selected and the requested bus unit (e.g. four quadwords) is outgated as the requested L1 data on the data bus to the CPU.

Thus in FIG. 4, each circuit 75 comprises a pair of gates 76, 77 and a decode circuit 78. Gate 76 is enabled by the first (leftmost) bit P when it is in a one state to select and pass the first set of LPF bits b1 and b2 to decode circuit 78. Gate 77 is enabled by the second (rightmost) bit P when it is in a one state to select and pass the second set of LPF bits b1 and b2 to decode circuit 78. Decode circuit 78 combinatorially decodes its received bits b1 and b2 to determine the particular L1 data line of the four (A, B, C, or D) in the selected congruence class in the L1 cache.

If the compare operations of directory 60 find only unequal comparisons for the directory entries in the selected congruence class, there is no L2 cache hit; and a L2 cache miss is declared. It is signaled to the output gate of TLB 62 in FIG. 3 to control the outputting from TLB 62 to main memory of a RA (in a UP) or an AA (in a MP) for fetching the missed L2 line. An L1 miss signal is generated in FIG. 3 by an AND circuit 81 which receives the inverted outputs of decoders 78.

Figure 8:
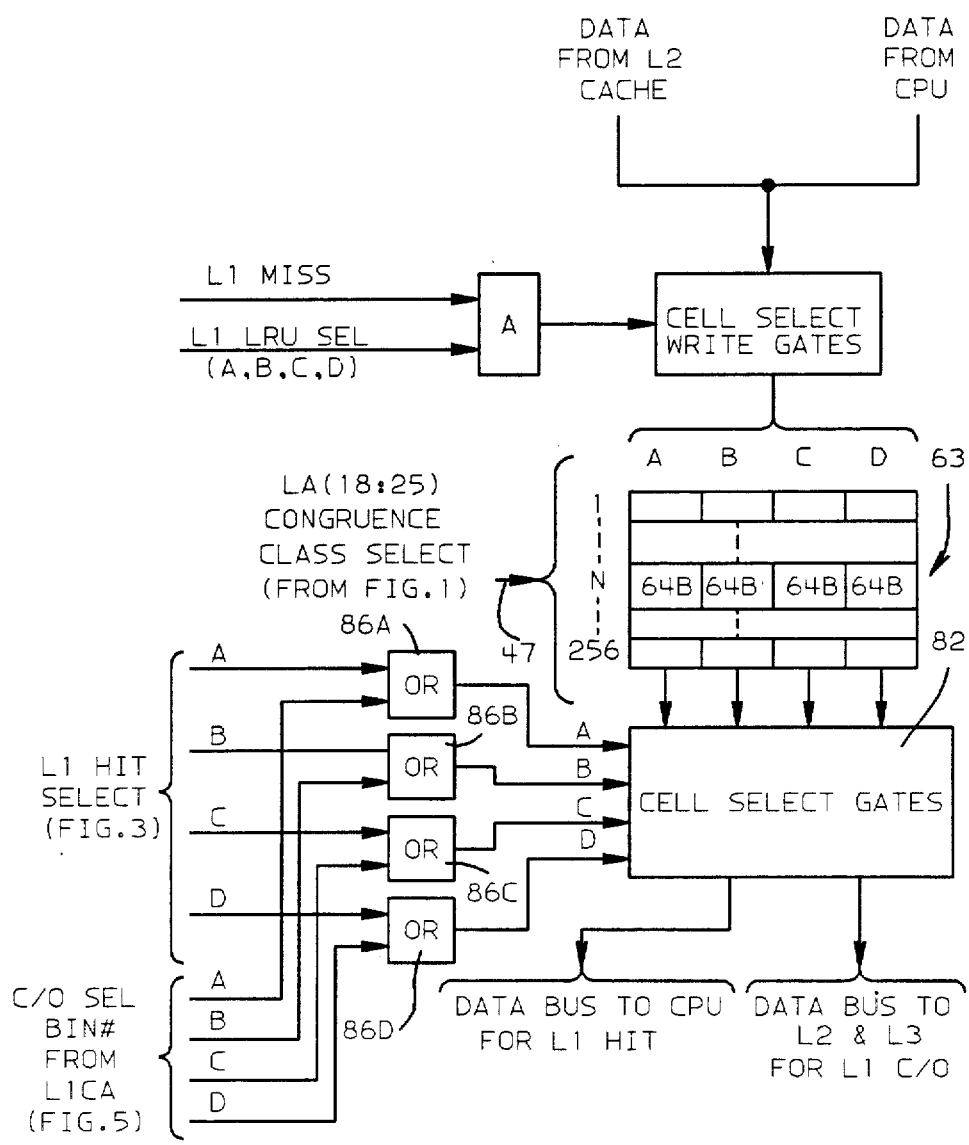
FIG. 8 shows a general structure for the L1 cache shown in FIG. 3.

FIG. 8 represents the L1 cache and its data line select circuitry. Each L1 data cell can contain a data line having 64 bytes in this example. Its cell select gates 82 select one cell in the selected congruence class by enablement of one of its input lines A, B, C or D, which are activated by the output of one of OR circuits 86 A, B, C or D, that are enabled by the output of either an L1 hit select signal A, B, C or D, or a castout selected bin number from the L1 control array 61 in FIGS. 3 and 6. The cell select gates 82 provide two types of outputs from the selected data line; they are the entire line and the data unit in the line being requested by the CPU. The entire data line is needed when it is being castout to the L2 cache and the L3 main memory. This transfer occurs as two contiguous 64 byte blocks; each requiring a separate L1 cycle using LA bits 18:25. The data unit in the selected data line is needed when it is being requested by the CPU, and it is addressed within the selected data line by LA bit 25 for being outputted on the data bus to the CPU.

Figure 9:
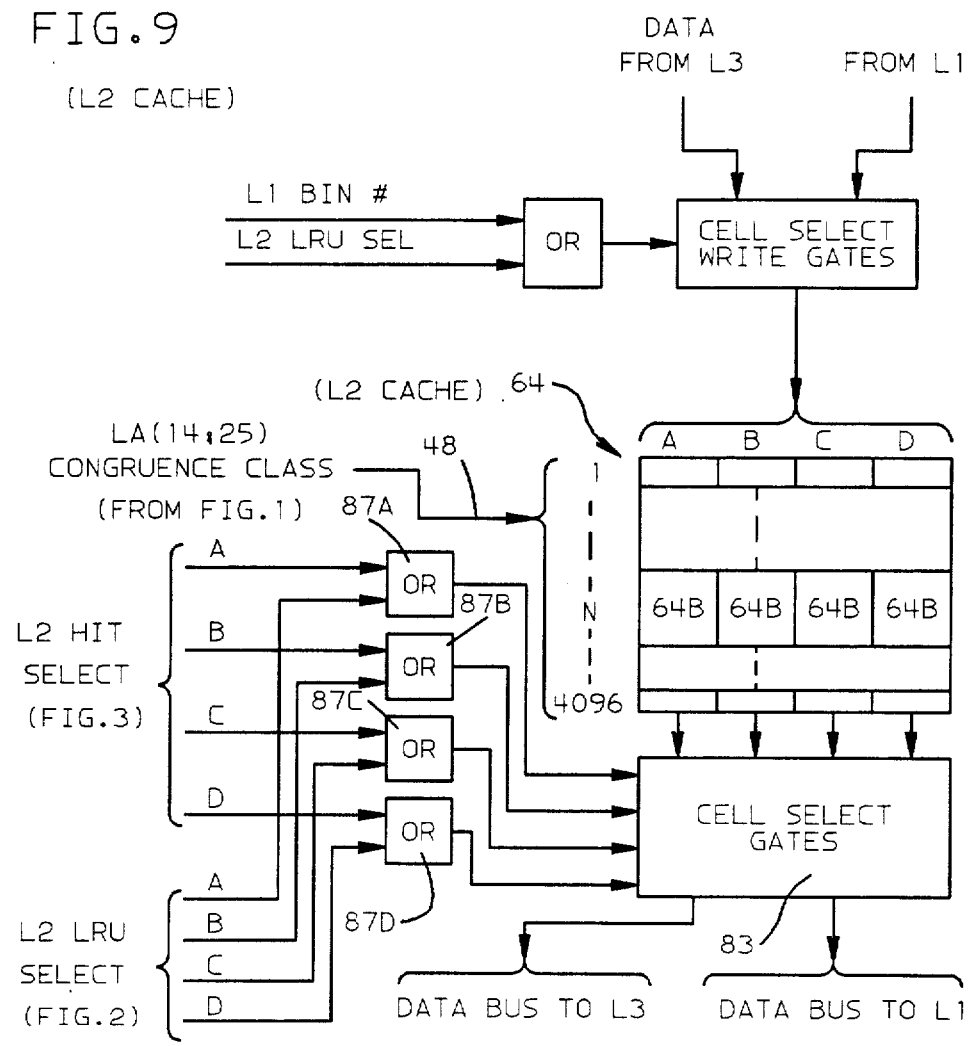
FIG. 9 shows a general structure for the L2 cache shown in FIG. 3.

FIG. 9 represents the L2 cache and its L2 data line select circuitry. Each L2 data cell can contain a bus unit of 64 bytes in this example. Its cell select gates 83 select one cell in the selected congruence class by enablement of one of its input lines A, B, C or D, which are activated by the output of one of OR circuits 87 A, B, C or D, that are enabled by the output of either an L2 hit select signal A, B, C or D from FIG. 4, or a castout LRU select signal from the L2 LRU circuit 67 in FIG. 3. The cell select gates 83 provide two types of outputs from the selected data line; they are the entire line and the data unit in the line being requested by the CPU. The entire data line is needed when it is being castout to the L3 main memory. (A cast-out from the L2 cache is required only when L2 is operated as a store-in cache. If L2 is a store-thru cache, then no cast-out is required after the LRU designation for the new entry.) The L1 part of the selected data line needs to be addressed within the selected L2 data line by LA bit 24 for receiving any L1 line being castout of the L1 cache on the data bus to the L2 cache. The L2 transfers occur in bus units of 64 bytes.

In FIG. 3, no output from translation Lookaside Buffer (TLB) 62 is needed for cache accessing until an L2 cache miss occurs. The TLB simultaneously stores the page frame addresses of both "real addresses" (or "absolute addresses") and "virtual addresses" that have been recently requested by the CPU. The TLB congruence class is addressed by bit positions 12 to 19 (12:19) of each CPU requested logical address, and all entries in that class are compared with the ACF and with LA 1:11. If they compare equal, the requested address is contained in the TLB; then its page frame real address is immediately known to the CPU from the TLB for accessing main memory, and a "long path" DAT wait cycle is avoided.

The TLB generates an entry for each requested LA address, regardless of whether it is a translatable LA or an untranslatable LA (i.e. VA or AA). In this regard, TLB 62 is not a true TLB, because a true TLB only contains translatable addresses (i.e. VAs). That is, the LA field in any entry in TLB 62 may contain either a VA or RA. But the AA fields in all entries in the TLB always contain only RAs or AAs, according to whether the TLB is in a UP or MP, respectively.

The TLB array stores, for each entry, a portion of the effective logical address, the STO, etc., as is conventionally required for TLB operation. Each valid TLB entry also contains the page Absolute Address (AA).

The LA bits 12:19 on bus 44 from FIG. 1 select a TLB congruence class. Also, bus 41 provides the ACF field to the TLB 62 to do a comparison between the signaled ACF and the ACF-representation in each TLB entry. Like the cache directory compare circuits, the TLB compare circuits automatically operate under control of the ACF signals to control the comparison according to whether it is between: (1) an untranslatable LA and a translatable entry-represented address (TERAD), (2) a translatable LA and an untranslatable entry-represented address (UETRAD), (3) an untranslatable LA and an untranslatable EA, or (4) a translatable LA and a TERAD. This invention requires that an unequal comparison always be declared for cases (1) and (2), even though the compared LA values are equal. Only comparison (3) or (4) may be declared an equal comparison when the compared LA values are equal. Accordingly a TLB hit is determined only for an equal condition found under the process of this invention, which is only when the requested LA and each of the TERADs in the selected congruence class have the same translation characteristics when their TERADs equal the requested LA in register 30. And a TLB miss is determined under the process of this invention when the requested LA and each of the TERADs in the selected congruence class have different translation characteristics even though their TERADs equal the requested LA in register 30.

Upon a L2 cache miss, the TLB is caused to output an address (an RA or AA), which is sent to main memory L3 to fetch the missing L2 data line. Before the TLB can do this, it must contain an entry for the requested LA. It is searched using the LA to find a congruence class, and using the ACF and high-order LA bits for examining its entries. If all entries in the selected TLB congruence class cause an unequal comparison, the requested LA does not have any entry in the TLB, and a TLB miss is declared. Then a TLB entry is generated for the requested LA. But the requested LA requires translation only if it is a VA, and then the LA is sent to DAT circuitry in the CPU to perform the translation, in which case the CPU must wait for this translation to complete the entry and have the translated address with which the required L2 data line can be fetched from main memory. However the CPU can operate in parallel with TLB operation if the CPU has another address to request in another L2 cache data line, while the L3 fetch is being made.

Figure 10:
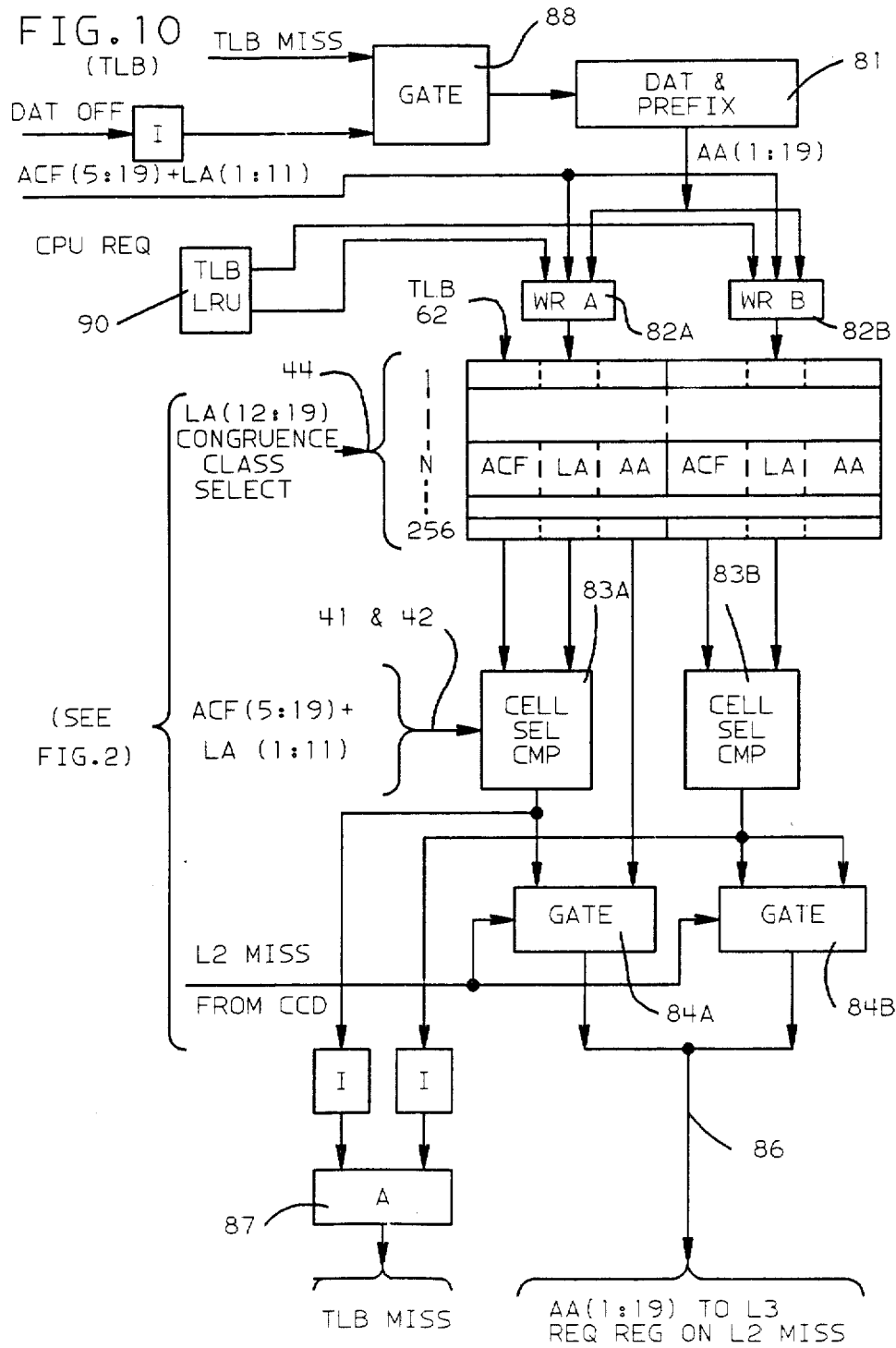
FIG. 10 shows the general structure for the translation lookaside buffer (TLB) shown in FIG. 3.

FIG. 10 shows more detail for the TLB circuit used in the embodiment of FIG. 3. It is two-way set associative, and one of its congruence classes is selected by the current LA bits 12:19. It has cell select compare circuits 83A and B respectively receiving the two cells outputted from the selected congruence class. Each circuit 83 is internally identical to each circuit 71 in FIG. 4, and each circuit 83 detects compare-equal inputs from its cell and from the current CPU request by providing an output signal to its respective gate 84A or B to enable it to pass the absolute address (AA) from its cell to an address bus 86 to main memory L3. If the respective circuit 83 receives unequal inputs, it does not enable its gate 84. At most, only one of gates 84A and B can output an AA to bus 86.

A TLB miss is detected by an AND circuit 87, which receives the inverted inputs from the outputs of cell select compare circuits 83A and B. Each TLB miss is provided by AND circuit 87 to a gate 88, which is enabled by any DAT ON signal from PSW bit 5 in FIG. 1 to thereby pass a current virtual address to DAT circuits 81 in FIG. 10 for translating it to an AA. A TLB LRU circuit 90 enables a respective write circuit 82A or 82B to write the newly generated AA in a TLB cell assigned by the LRU circuit to receive a new entry for the VA that missed in the TLB.

No TLB output is required when the directory 60 has found a L2 cache hit, even though directory 60 also may have found a L1 cache miss. The L1 miss condition is determined by the L1 hit circuitry 75 whenever the set-associative comparison operation for a selected congruence class in directory 60 finds an L2 entry having a compare-equal status (i.e. L2 hit). Circuitry 75 uses: (1) the LPF select field in the found L2 entry, and (2) LA bit 24 from the current logical address in order to determine if any part of the corresponding L2 line (now known to be available in L2 cache directory 64) is present in the L1 cache. If LA bit 24 is zero, the first part of the LPF field is selected. If LA bit 24 is one, the second part of the LPF field is selected. In the selected part of the LPF field, the state of the P bit is tested: If the P bit is one, the requested data is in L1, and an L1 hit is declared. The LPF bits b1 and b2 are combinatorially examined to determine which L1 entry (A, B, C or D) is the L1 hit. Then the L1 cache hit, which is signalled on one of four lines A, B, C, or D to L1 cache 63 to enable accessing the correct L1 to obtain the requested data from it, which is located by address bits 18:25 and outgated to the CPU.

When the P bit is zero, and an L1 miss is declared, i.e. a L2 hit and L1 miss situation, the L1 line is fetched from the current L2 hit line and is copied into the L1 cache, while the requested data in the line is being sent to the CPU. The part of the L2 line comprising the required L1 line is located by the LA bits 14:24 and the requested data in that part (i.e. 64 bytes) is located in L1 cache 63 by the LA bits 18:25.

Essential supplementary information about the L1 entry being generated is stored in an L1 control array 61, which is done when the CPU misses in L1. Whenever an L1 entry is selected by the L1 LRU to make space for a new L1 entry, any L1 entry existing in that space (which has the change bit set on) must be castout to L2, and the logical address (LA) field in the L1 control array 61 is needed to locate the corresponding L2 entry. The L2 address is formed from LA[14:17] from the control array and LA[18:25] from the requesting address.

Since the L1 cache is a store-in cache, and its CPU may be in an MP, there will be times when the activity of another processor (e.g. channel or another CPU) will provide a foreign request that may require the invalidation or castout of a changed L1 data line in the L1 cache. Such a request from an external source does not know the location of any corresponding entry in the L1 or L2 cache. The L1 control array 61 (L1CA) in FIGS. 3 and 6 supports several functions in relation to L1 cache 63, including normal L1 cache flag indications. Each request requiring an L1 line invalidation or castout from L2 or from the L1 and L2 caches, must send the required LA bits of the request.

The location of each entry in the L1 control array 61 corresponds to a like located L1 line in the L1 cache. The content of the L1CA entry represents the state of the corresponding data line in the L1 cache. The content of each L1CA entry is shown in FIG. 7 to contain the following fields (the values in parenthesis are the number of bit positions that the field may occupy in the embodiment):

I field: represents the invalid/valid state of the respective L1 line.

EX field: represents the exclusive/readonly state of the respective L1 line represented by the entry.

C/O LA field: contains bits 12:17 of the logical address in the address being generated. These bits are concatenated with bitts 18:23 in the requesting address for locating the congruence class in the common cache directory and the TLB.

Bin# field: finds the associative set (A, B, C or D) in the selected common directory congruence class. The corresponding L1 and L2 cache entries can be in any associative set in either cache. That is, the bin# indicates the associative set in L2 for a line in L1.

CH field: represents the changed/not changed state of the respective L1 line represented by the entry. Only changed lines are castout of any cache.

LRU field: represents the least recently used (LRU) entry of the associative sets A, B, C, and D for the four entries in each congruence class in the L1 cache.

In a uniprocessor (UP), the local CPU is the only CPU in the system, although there are usually other processors in the form of channel processors. In a multiprocessor (MP), there are other CPU(s) in addition to the local CPU, and each respective CPU may have one or more channel processors or none.

When the local CPU makes a request which misses in the common directory 60, the L1 LRU locates a corresponding L1CA entry in the selected congruence class in L1CA and the L2 LRU locates an entry in the selected congruence class in the directory 60. The fields in the accessed L1CA entry are generated when the corresponding common directory entry is generated in the directory 60. In both arrays, the corresponding invalid (I) fields are then set off, the corresponding change (CH) fields are set on whenever the L1 line receives a write access, the corresponding exclusive/readonly bits (E) are set according to the L1 line request type (if any L1 line is exclusive in an L2 line, the entire L2 line is set to the exclusive state), the high-order LA bits 12:17 are set in L1CA for later use in finding the corresponding entries in the L2 cache and the TLB, the bin number of the corresponding L1 cache location is inserted into the common directory entry, and the L1 and L2 LRU fields controlling the congruence classes containing these entries are updated by the respective LRU circuitry 67 and 68 to control the selection of a candidate for replacement of the next entry in the respective congruence class.

Thus, the L1 control array (L1CA) 61 enables any changed entry in the L1 cache to be castout to the L2 cache at the correct L2 location, such as when there is no invalid entry available and the L1 LRU circuitry must choose one of the valid entries, in which case the LRU selects the least recently used entry in the same congruence class and causes it to be castout. This is done by first storing the content of the reassigned L1 cache entry in its corresponding location in the L2 cache at a set-associative location determined by the bin number (bin#), and the L2 congruence-class locating field in the L1CA entry originally obtained from the bits 12:17 in the corresponding LA address.

A L1 LRU entry assignment is require when ther is a L1 cache miss and all set-associative entries are valid (with previously-written entries) in the addressed congruence class. This will cause a L1 castout from an LRU selected entry, if it represents a line with changed data. No cast out is needed if the represented data is unchanged.

A LRU L1 castout will be to a corresponding entry in a valid L2 cache line, and to main memory L3 when L2 is a store-thru cache. In that case, the TLB is addressed by LA 12:17 from the control array and LA [18:19] from the requested address. The directory entry at the castout location gives the ACF and LA [1:11] fields needed to complete the TLB compare to determine the L3 address (AA or RA) for the castout line. The new request (causing the current L1 miss) will have a new entry written into the LRU freed entry. That is, a new entry is to be written in L1 at the LRU assigned location. However before the new entry can be written, any required cast out from the old entry must be made before the information in the old entry is destroyed by being written over. The invention solves this problem by storing the LA [12:17] and the bin# from the L1CA array in the entry corresponding to the LRU selected entry, which must be accessed for the cast out before the old L1CA entry is written over by a new L1CA entry for the new L1 line. The casoout L1 entry can be in any set associative location in the cast-out L2 congruence class, whereas the L1 entry can be found in any set associative entries of the addressed L2 congruence class.

Another cause of L1 cache line castout or invalidation is a cross-interrogate (XI) request (1) from another CPU for an exclusively (EX) held L2 line if the requested line is indicated to be changed by the corresponding entry in the L1CA, or (2) from a channel processor for data from a requested line.

Cross-interrogate directories are used to determine the potential need for a cache line cast-out or invalidation by another CPU. (A pertinent cross-interrogate directory is described in the IBM Technical Disclosure Bulletin, Volume 26, No. 11, April 1984, pp 6069–6070.)

Figure 16A:
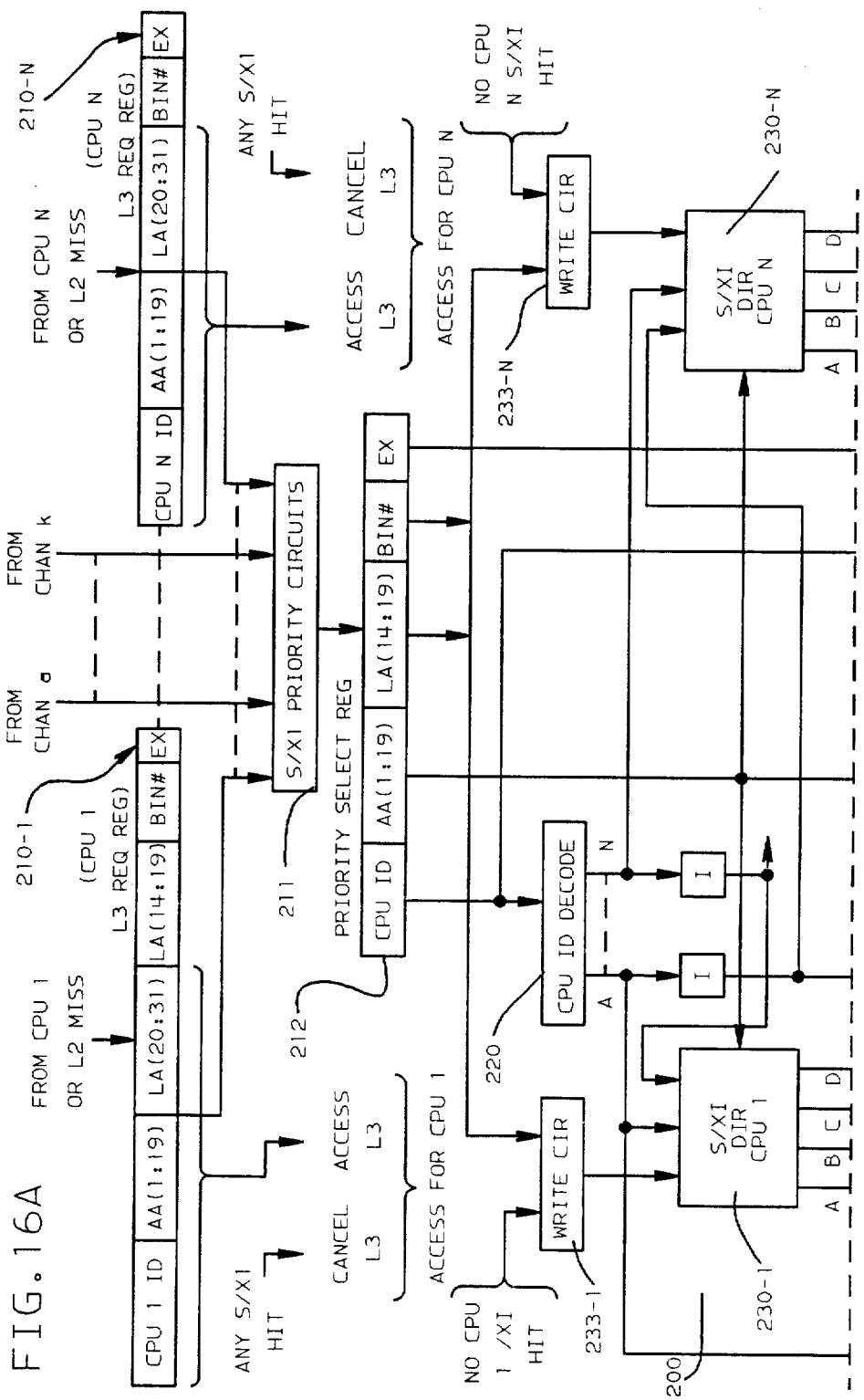

The synonym and/or cross-interrogation directory (S/XI) arrangement in FIGS. 16A and 16B provide a S/XI directory associated with each CPU in the MP. Each S/XI directory is a synonym (S) directory for the common cache directory in its associated CPU. Each S/XI directory is also a cross-interrogation (XI) directory for all other CPU(s) provided in the multiprocessor system, and for all channels.

In FIG. 16A, the plurality of synonym/cross-interrogate (S/XI) directories 230-1 through 230-N correspond to the respective CPUs 1-N in the MP system. In a UP system, only directory 230-1 is provided.

Upon a L2 cache miss, the real/absolute address outputted from the associated TLB is used to address all S/XI directories to locate a congruence class in each S/XI directory 230. Each congruence class contains plural set-associative entries.

Each entry in any S/XI directory 230 has a corresponding entry in its associated common cache directory, but the S/XI congruence classes do not correspond to the cache directory congruence classes, because the cache congruence directory associated with a requesting CPU; and a XI search occurs in all of the other S/XI directories.

The content of each entry in each XI directory, 230 is illustrated in FIG. 16B by the illustrated entry 231, and it contains: an absolute address, the L2 congruence-class locating field (LA [14:19]), a bin number (bin#), an exclusive indicator, an invalid indicator, and a directory LRU field. The contents of each entry (except its LRU field) reflect the information about the common cache miss that generated the respective S/XI entry.

The output of S/XI priority circuit 211 (provided to register 212) contains the selected request's CPU ID, its absolute address, its common directory bin number, and its Exclusive bit state. Absolute address register 212 receives the priority selected output request, and CPU ID decoder 220 receives the identifier of the CPU which has the request in register 212. (In a UP, no CPU identifier is necessary since there is no other CPU in the system.)

All S/XI directories are searched for the current request's absolute address bits 1:19 (and optionally for logical address bits 14:19) in register 212. Compare circuit 232 receives the (n) entries (e.g. four) in each directory's congruence class addressed by the absolute address bits 14:19 in register 212, and compares the absolute address field in each of the four entries with the absolute address bits 1:13 in register 212 to determine if any entry in any S/XI directory contains an entry having that absolute address. Comparator 232 outputs an unequal signal on line 234 or an equal signal to ANDs circuit 251, 252, 253 and to gate 261.

If no entry in the requesting CPU's associated S/XI directory is found to compare-equal with the request's absolute address, an unequal signal is provided to a write circuit 233 associated with the same S/XI directory. Then there is no synonym entry in the requesting CPU's cache, and a new S/XI entry is written into the addressed congruence class at a set-associative location determined by the S/XI LRU field in the respective S/XI entry to represent the requested L2 line in the S/XI directory. The new entry will be used by subsequent S/XI searches to determine synonym or a XI hit conditions for the new L2 line fetched into the L2 cache as a result of the current request.

(There must be no entry in the requesting CPU associated S/XI directory found to compare-equal with both the request,s absolute address and its LA, because then the entry is indicated to be in the requestin9 CPU's cache, and a no L2 miss should have occurred; and an error condition should be indicated.)

A "synonym hit" is indicated by an equal signal output from AND circuit 252 when a compare-equal condition is found with the AA field (and not with the LA field) of any entry in the S/XI directory associated with the CPU having the current request.

A "XI hit" is indicated if a compare-equal condition is found in any other S/XI directory (i.e. associated with a CPU other than the requesting CPU). Thus each S/XI directory is a synonym directory for its associated CPU; and the same directory is a cross-interrogate directory for all other CPUs and all channels in the system.

The XI search is simultaneously done in the other S/XI directories by AND gates 252 and 253, which receive the equal signal from comparator 232 and also receive an inverted CPU ID signal from the CPU ID decoder 220 indicating that they are operating for the other CPUs and not for the associated CPU. Circuit 252 also receives the EX signal from the found S/XI entry to output a cast out signal to its associated CPU for the current request.

Circuit 253 also receives an RO signal (the invert of the EX signal) from the found S/XI entry and a signal from the EX field in register 212 to output a XI invalidate signal to its associated CPU for the current request to indicate when the current request is for an exclusive request which hit a readonly entry that could not have been changed and therefore only needs invalidation.

Whenever a synonym or XI hit is obtained in any S/XI directory, some of the content of the hit entry is sent to the requesting CPU (i.e. the CPU currently having its CPU ID in register 212). The transferred content is the L2 congruence-class locating field, the bin number (bin#), and the exclusive/readonly (E) field. This is done by gate 261. The transferred L2 congruence-class locating field will address the correct congruence class in the common directory and L1CA; and the transferred bin# locates the required entry therein. The LPF in the selected common directory entry locates the L1 line to be accessed for a synonym hit, or the L1 line(s) to be castout to the requesting CPU for a XI hit.

A S/XI out bus 290 receives the output signals from the S/XI directory having a S or XI hit and provides them to the requesting CPU having the CPU ID currently in register 212. FIG. 17 shows a circuit for each CPU that receives the signals outputted from FIG. 16.

In FIG. 17, when received by the requesting CPU, a synonym signal from the S/XI circuitry to store/fetch control logic circuits 314 causes the requesting CPU to execute the cache access at the synonym address. But a XI cast out signal to c/o control logic circuit 312 causes a cast-out of the addressed line only if it is changed, i.e. its CH bit is on. The bin number is received by decoder 301 which activates an AND circuit 303A, B, C or D when it is conditioned by a synonym, castout or invalidate signal from OR circuit 302 to provide a signal to OR circuit 70A, B, C or D in FIG. 4.

In this manner the bin numbers are sent to the L1CA, where the line change bits are tested. For each such changed L1 line for the XI request, a cast-out is initiated to update the corresponding L1 line part(s) in the L2 cache, and then this L2 line is castout to update the corresponding line in main memory (L3) from which the requesting CPU can get its requested XI data. (For a store-thru L2 cache, only the L1 cast-out operation is required, since it will store-thru to main storage.)

Thus the S/XI directory may be considered to be partitioned into N discrete parts, in which N is the number of processors, each with a private cache(s) that share(s) main memory (L3). One such partition is allocated to each CPU. If the S/XI interrogation finds a XI hit on a partition different than that allocated to the requesting CPU, then a cast-out request is initiated. However, if the S/XI interrogation finds a hit to the partition allocated to the requesting processor, this is a synonym discovery. In the second case the LA [14:19] and bin number are returned to the requesting CPU, and the cache access may now execute at the synonym address.

Figure 11:
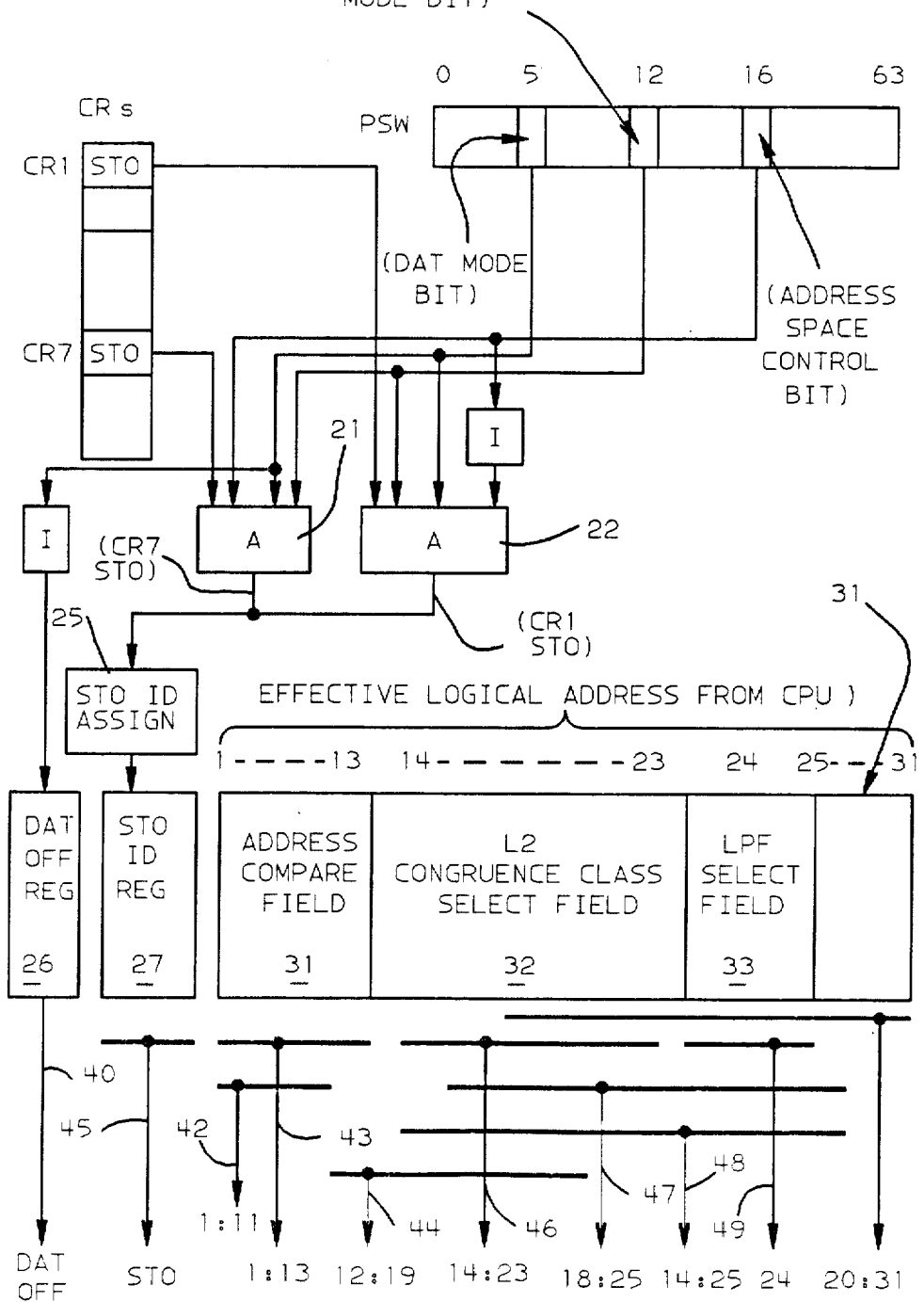
FIGS. 11 and 12 provide a diagram of another embodiment of the invention.
Figure 12:
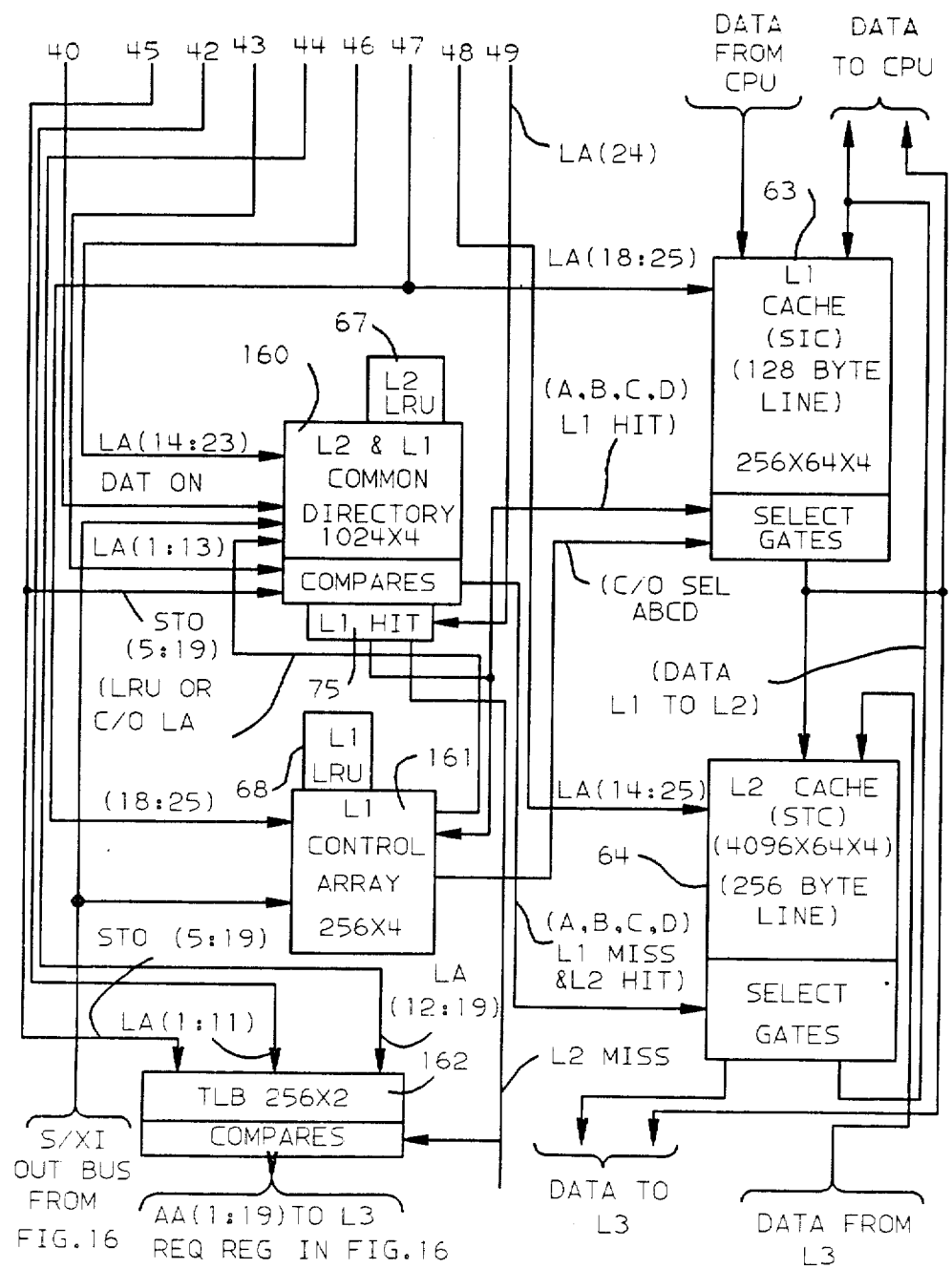

The second embodiment shown in FIGS. 11 and 12 primarily differs from the embodiment in FIGS. 1 and 3 in the entry structure of the common cache directory 160 and TLB 162. In FIG. 12 each entry in directory 160 and TLB 162 contains a one bit DAT OFF field received from the current S/370 PSW in the CPU as a zero or one value, respectively indicating DAT OFF and DAT ON states, and also contains any STO or STO ID being provided by the CPU.

In FIG. 12, the common cache directory (CCD) 160 is also used (like in FIG. 3) for accessing data in a two-level cache organization private to a high-performance central processor (CPU). Likewise the CCD contains only untranslated address bits of previously requested CPU addresses, whether or not those address were translatable. Also a "local search" within the CCD is executed in hardware to determine if a line containing requested data is in the L1 or L2 cache, and if so, the CCD generates a signal to "gate" the addressed data to the CPU from the L1 cache if available in L1; and if not, then from the L2 cache if available in L2.

Thus the common cache directory 160 and TLB 162 in the second embodiment use a different form of the CPU requested switchable logical addresses in their untranslated form (whether or not they are translatable) for accessing both the L1 and L2 caches. The requested form of each logical address (regardless of its actual type) is likewise used uniformly in cache operations without translation, both: (1) within the entries in the common cache directory, and (2) to address the common cache directory, the L1 cache, the L2 cache, and an L1 control array.

In FIG. 11 circuits are also shown for switching the address type between untranslatable and translatable types, but the address type is indicated in a DAT OFF register 26 which receives the inverted value of the DAT mode bit 5 in the PSW. The content of register 26 is associated with the content in logical address register 30, in which a one value in DAT OFF register 26 indicates an untranslatable LA is in register 30, and a zero value in DAT OFF register 26 indicates an translatable LA is in register 30.

FIG. 11 shows unique hardware provided for the common directory to differentiate untranslatable (real) and translated (virtual) addresses. The DAT OFF register 26 is an address control register set by the inverted state of DAT mode bit 5 in the PSW to indicate whether a requested logical address in register 30 is a translatable or untranslatable address. Register 30 has a single bit field. A zero DAT OFF value in register 26 indicates the logical address in register 30 requires translation (it is a VA), and a one output indicates a logical address not requiring translation (it is a RA or AA). A STO ID value in register 27 is set by the output of AND gate 21 or 22. The STO ID value in register 27 may be zero or non-zero, but it is valid only if the value in DAT OFF register 26 is zero; that is, if register 26 contains a one the content of STO ID register 27 is invalid.

In more detail, AND gates 21 and 22 are conditioned by DAT mode control bit 5, extended control (EC) mode bit 12 and address space control bit 16 for selecting between the STOs in CR1 or CR7. The output of AND gates 21 and 22 is dot-ORed to provide a STO signal to STO ID assignment circuits 25. Any selected STO ID is provided by the CPU. The outputs of registers 26 and 27 are provided on buses 40 and 45.

In FIG. 11 all of fields 40, 45, 42-49 are gated out simultaneously to FIG. 12 within a single machine cycle to directory 160, cache 63, L1 control array 161, TLB 162, and cache 64. Thus only the structure of directory 160 and TLB 162 in FIG. 12 are different from directory 60 and TLB 62 in FIG. 3. Likewise the single cache directory 160 operates in common for controlling the accessing of both L1 and L2 private caches 63 and 64.

Thus in FIG. 12, the addressing structure enables each untranslated CPU requested address to address in parallel and in a uniform manner the common directory 160, the L1 cache 63, the L2 cache 64, and the TLB 162.

Each entry in directory 160 has the exemplary format shown in FIG. 14, which differs from the format shown in FIG. 5, by FIG. 14 having a STO ID field instead of an ACF field, and additionally having a DAT OFF field.

Figure 13:
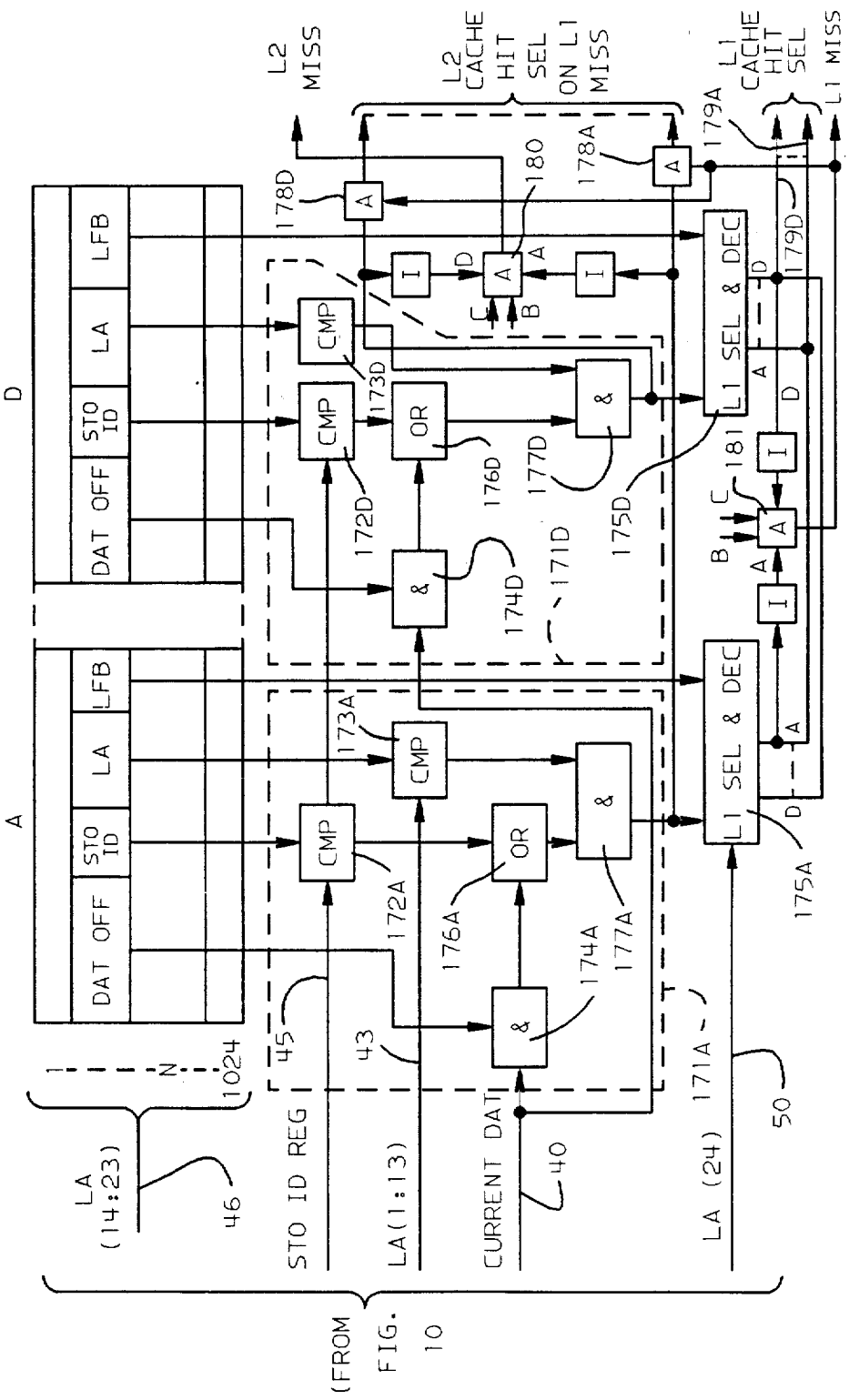
FIG. 13 shows a general arrangement of the unique common cache directory found in FIG. 12.

FIG. 13 represents the common cache directory 160 and shows an example of a selected one of its 4-way set-associative congruence classes. The compares in directory 160 are illustrated as four comparator circuits 171A-D for respectively comparing each of the four entries in the selected congruence class with the DAT OFF field and LA field 1:13. Each compare circuit 171 comprises sub-compare circuits 172 and 173, AND circuits 174 and 177, and OR circuit 177. When any AND circuit 177 provides an output signal, it indicates an "equal" comparison that determines the respective directory entry has a cache hit. When AND circuit 177 does not provide an output signal in response to a congruence class selection, it indicates an "unequal" comparison that determines the respective directory entry 65 does not have a cache hit. If the DAT OFF field is one, the CPU requested address in LA is a non-translatable address, and whatever value is in the STO ID field is disregarded in the comparison by providing a signal from AND circuit 174 through OR circuit 176 to enable AND circuit 177 regardless of the STO or STO ID values. If the DAT OFF value is zero, the STO ID (whether zero or non-zero) is used in the comparison operation, since AND circuit circuit 174 receives a zero value as the current DAT signal with the CPU request, and therefore does not provide any output signal to OR circuit 176, so that the output of the STO ID compare circuit 172 controls the enablement of AND circuit 177. An L2 miss signal is generated by an AND circuit 180 which receives the inverted outputs of AND circuits 177.

In this manner, each of the cache directory compare circuits 171 automatically operates under control of the current DAT state signal to determine whether the comparison is between: (1) a translatable LA and an untranslatable entry-represented address (UTERAD), (2) an untranslatable LA and a translatable entry-represented address (TERED), (3) an untranslatable LA and an UTERAD, or (4) a translatable LA and a TERAD. This invention requires that comparison (1) or (2) always be declared an unequal comparison, even though the compared LA values are equal. Only comparison (3) or (4) may be declared an equal comparison when the compared LA values are equal. Accordingly a L2 cache miss is determined whenever the requested LA and each of the TERADs in the selected congruence class have different translation characteristics, regardless of whether any of their TERADs equal the requestd LA.

Whenever a L2 cache hit is determined, the directory 160 also determines whether a L1 cache hit exists. The L1 hit circuit 75 in FIG. 12 is provided by select and decoders 175A-D in FIG. 13, one of which can receive an L2 hit output from one of AND circuits 177A-D if there is a L2 cache hit in the selected congruence class. Thus any L1 cache hit is determined by operation of the L1 hit determination circuitry 175A-D when a L2 hit is determined by the output of its respective AND circuits 177. Circuits 175A-D may be the same as circuits 75A-D in FIG. 4, and they operate in the same manner to locate the part of the LPF needed for determining if any L1 cache hit exists. Also the AND circuit 181 signals a L1 miss and is the same as the circuits 81 in FIG. 4.

AND circuits 178 each receive the L1 miss signal from circuit 181 and the respective L2 hit signal from circuits 177 to output a signal indicating a L1 hit on a L1 miss.

Any L1 hit signal from any decoder 175 is provided on one of four L1 cache hit signal lines 179A, B, C or D to the L1 cache 63 to select the correct data line of the four data lines in the congruence class currently being addressed in L1, cache 63 by the LA bits 18:25 being provided on signal lines 47. An activated one of the four data lines A, B, C, & D in the required L1 congruence class thereby selects a requested bus unit (e.g. four quadwords) in the line, and the unit is outgated as the requested L1 data on the data bus to the CPU.

In FIG. 12 (as in FIG. 3), no output from Translation Lookaside Buffer (TLB) 162 is needed for cache accessing until an L2 cache miss occurs (which statistically infrequently happens).

FIG. 15 shows more detail for the TLB circuit used in the embodiment of FIG. 12. The FIG. 15 TLB circuit differs from the TLB of FIG. 10 in that FIG. 15 uses a DAT OFF field and a STO ID field in each entry instead of the ACF field in FIG. 10. Each of compare circuits 80A and 80B in FIG. 15 is structured and operates the same as each compare circuit 171 in FIG. 13. Otherwise the TLB arrangements in FIG. 15 and FIG. 10 are the same.

While the invention has been particularly shown and described with reference to the preferred embodiments thereof, it will be understood by those skilled in the art that the foregoing and other changes in form and detail may be made therein without departing from the spirit and scope of the invention.

Having thus described my invention, what I claim as new and desire to secure by Letters Patent is:

1. A logical address private cache arrangement in a data processing system including a processor, a translation lookaside buffer (TLB) and a main storage, the processor being able to switch its mode of addressing between real and virtual in its requests for data units from main storage, the cache arrangement comprising:

a first cache accessible to the processor, the first cache having locations for containing a plurality of lines of data initially copied from main storage, a cache directory having a plurality of directory entries, each cache directory entry including a logical address representation with an associated indicator of whether the representation is of a real-/absolute address or is of a virtual address, means providing to the cache directory each logical address (LA) requested by the processor with an indicator signal of whether the requested LA is a real/absolute address or a virtual address, directory selecting means for receiving each logical address (LA) requested by the processor and selecting a set containing one or more potential hit entries in the cache directory, cache hit determining means for examining each potential hit entry in the set by comparing the logical address (LA) and the indicator signal requested by the processor with a LA representation and the associated indicator in each valid entry in the set for a match condition in order to determine if any entry is a hit entry without using any address translation from the TLB.

2. A logical address cache arrangement in a data processing system as defined in claim 1, further comprising:

plural caches private to the processor including the first cache and one or more other caches up to an Nth cache, the caches being at different hierarchy levels in relation to the processor, the cache directory being a common cache directory for the plural caches for receiving each indicator signal and its logical address (LA) request from the processor to determine if data requested by the processor exists in any data line in one or more of the plural caches.

3. A logical address cache arrangement in a data processing system as defined in claim 2, further comprising:

the directory selecting means receiving a LA representation from the processor for each new storage request for seleting a congruence class of set-associative entries in the common directory, the cache hit determining means comparing each requested indicator signal and its LA signal with each indicator and its LA representation in each valid entry in the selected congruence class to determine if a hit entry exists in at least one of the caches.

4. A logical address cache arrangement in a data processing system as defined in claim 2, further comprising:

means for providing to the TLB each LA and for inserting in the TLB the LA and its translated or untranslated real/absolute address in accordance with a processor request for translation, common cache directory miss signal means for generating a miss signal when no common directory entry is found for the indicator and LA representation requested by the processor, TLB output means actuated by a common cache directory miss signal to provide the translated or untranslated real/absolute address, associated with a requested LA, for a main storage access.

5. A logical address cache arrangement in a data processing system as defined in claim 2, further comprising:

at least one control array associated with the first cache to contain information for determining locations in another cache to receive castouts from locations in the first cache selected for replacement.

6. A logical address cache arrangement in a data processing system as defined in claim 4, further comprising:

control array addressing means receiving a requested LA from the processor for each new storage request for selecting a congruence class of set-associative entries in the control array.

7. A logical address cache arrangement in a data processing system as defined in claim 3, further comprising:

at least one control array associated with the first cache to contain information supplementary to the common directory for determining locations in another cache for castouts of the first cache.

8. A logical address cache arrangement in a data processing system as defined in claim 5, further comprising:

line presence fields (LPFs) in each entry in the common cache directory for indicating whether any part of an associated line in the Nth cache is available in another cache more directly accessible to the processor.

9. A logical address cache arrangement in a data processing system as defined in claim 8, in which:

each line presence field (LPF) has first subfields for indicating whther or not one or more locations in the other cache contain part(s) of the line in the Nth cache associated with the entry in the common cache directory containing the respective line presence field (LPF).

10. A logical address cache arrangement in a data processing system as defined in claim 9, in which:

a second subfield is provided with each first subfield in each line presence field (LPF) for indicating the particular location in the other cache that contains an associated part of the line in the Nth cache indicated to exist in the other cache.

11. A logical address cache arrangement in a data processing system as defined in claim 10, further comprising:

a logical address (LA) field being contained in each entry in the control array for containing a LA for locating a lne in another cache to be updated by a cast out of the corresponding line in the first cache if the corresponding line has been changed.

12. A logical address cache arrangement in a data processing system as defined in claim 11, further comprising:
 a change field (CH) being contained in each entry in the control array for indicating any change previously made in the associated line being cast out of the first cache to update a line in another cache located by the LA field in the same control array entry.

13. A logical address cache arrangement in a data processing system as defined in claim 11, further comprising:
 an exclusive/readonly field (EX) being contained in each entry in the control array for indicating the exclusive/readonly state designated for an associated line in the first cache.

14. A logical address cache arrangement in a data processing system as defined in claim 11, further comprising:
 a bin number field being contained in each entry in the control array to locate a set-associative position in a conguence class located by the LA field in the same control array entry in order to find the line in another cache to be updated by receiving a cast out of the corresponding line in the first cache array if the corresponding line has been changed.

15. A logical address cache arrangement in a data processing system as defined in claim 4, further comprising:
 a synonym directory containing a plurality of entries and being associated with the common directory,
 a LA field in each synonym directory entry for enabling the locating of a common directory entry which caused the generation of the respective synonym directory entry,
 means for locating in the synonym directory entry a real/absolute address representation that is the same as a real/absolute address provided for a requested LA, causing by a common cache directory miss signal requiring a main storage access,
 means for generating in the synonym directory a new entry when no synonym entry is found, the new entry having a real/absolute address representation that is the same as the received translated or untranslated real/absolute address associated with the requested LA that caused a current common cache directory miss signal.

16. A logical address cache arrangement in a data processing system as defined in claim 15, the locating means further comprising:
 synonym directory addressing means for receiving each translated or untranslated real/absolute address (associated with a requested LA) for a main storage access due to a common cache directory miss signal to select a congruence class in the synonym directory which may contain a synonym entry,
 set-associative comparison means for comparing the received translated or untranslated real/absolute address with the real/absolute address representation in each entry in the selected congruence class to find any synonym entry by an equal comparison.

17. A logical address cache arrangement in a multiprocessing (MP) system, including a plurality of data processing systems as defined in claim 4, all CPUs in the MP system having their caches access data in a common main storage, the MP system further comprising:
 a plurality of main storage request registers respectively receiving cache miss requests from the CPUs, each cache miss request including at least a real/absolute address representation and a LA representation of the request that missed in the respective cache,
 a plurality of synonym/cross-interrogate (S/XI) directories, each containing a plurality of S/XI entries and being associated with the common directory of a respective CPU, each S/XI entry including at least a real/absolute address representation and a LA representation found in a current entry in the respective cache,
 a priority circuit receiving the cache miss requests provided to the main storage request registers and priority selecting based on a priority, a received cache miss request of an identified CPU for a S/XI determination,
 S/XI search means with each S/XI directory for receiving a real/absolute address representation provided with a priority selected cache miss request for searching the S/XI entries in each S/XI directory for any equal real/absolute address representation, the S/XI search means providing an unequal signal if no S/XI entry is found or providing S/XI hit signals if a S/XI entry is found, the S/XI hit signals including the LA representation in the S/XI entry found by a S/XI search,
 a S/XI bus logic transmitting the LA representation with hit signals to the CPU requesting the S/XI search.

18. A logical address cache arrangement in a multiprocessing (MP) system, as defined in claim 17, the MP system further comprising:
 a synonym signal being provided by the S/XI bus logic to the requesting CPU, when the CPU making a request is identified as the CPU associated with the S/XI directory providing the hit signals found by a S/XI search.

19. A logical address cache arrangement in a multiprocessing (MP) system, as defined in claim 17, the MP system further comprising:
 a cast out signal being provided by the S/XI bus logic to the requesting CPU, when the CPU making a request is identified as not being the CPU associated with the S/XI directory providing the hit entry found by a S/XI search.

20. A logical address cache arrangement in a multiprocessing (MP) system, as defined in claim 17, the MP system further comprising:
 a cast out signal being provided by the S/XI bus logic to the requesting CPU, when the CPU making a request is identified as not being the CPU associated with the S/XI directory providing the hit entry, and the hit entry identifies exclusive data.

21. A logical address cache arrangement in a multiprocessing (MP) system, as defined in claim 17, the MP system further comprising:
 an invalidate signal being provided by the S/XI bus logic to the requesting CPU, when the CPU making a request is identified as not being the CPU associated with the S/XI directory providing the hit entry, and the hit entry identifies readonly data when the current request is for exclusive data.

22. A logical address cache arrangement in a multiprocessing (MP) system, as defined in claim 17, the MP system further comprising:

a set-associative bin number field and a LA representation field and a real/absolute address representation field being provided in each of the main storage request registers respectively receiving cache miss requests from the CPUs, each S/XI entry in each synonym/cross-interrogate (S/XI) directory containing a set-associative bin number field and a LA representation field and a real/absolute address representation field, each S/XI entry being associated with the common directory of a respective CPU, the S/XI search means including a S/XI priority register for receiving the priority selected output of the priority circuit for searching the S/XI entries in each S/XI directory, the S/XI priority register containing a set-associative bin number field and a LA representation field and a real/absolute address representation field, the bin number in a found S/XI entry identifying a set-associative location in a CPU cache required by a CPU request currently in the S/XI priority register.

23. A logical address cache arrangement in a multiprocessing (MP) system, as defined in claim 22, the MP system further comprising:

set-associative location selection means of the CPU identified by hit signals on the S/XI bus to ingate a bin number being transmitted on the bus for selecting a set-associative location in a Nth cache of the CPU, the selected location containing LPF fields for locating any set-associative entry(s) in any faster-access cache for obtaining data lines needed for cast out and/or invalidation, means for casting out and/or invalidating any lines found in the faster-access cache at locations indicated by the LPF fields and then casting out and/or invalidating a line found at the selected location in the Nth cache.

24. A logical address cache arrangement in a data processing system in which a processor also provides a translation table identifier with each requested logical address, comprising:

the cache means including an L1 cache and an and L2 cache, each line in the L2 cache being a multiple of the line size in the L1 cache, the L1 cache having faster access time than the L2 cache for a request CPU, each entry in a common cache directory corresponding to a data line in the L2 cache and including a line presence field (LPF), the LPF including a plurality of subfields equal in number to the multiple of the line size in the L1 cache, a plurality of subline locations in each line location in the L2 cache corresponding to the respective subfields in a LPF, each L2 subline location being equal in size to the line size in the L1 cache, each subfield in the LPF indicating if a corresponding L2 subline exists in the L1 cache.

* * * * *